United States Patent Office 3,594,480
Patented July 20, 1971

3,594,480
NITROGEN HETEROCYCLES FOR
THERAPEUTIC ADMINISTRATION
Timothy H. Cronin, Niantic, and Hans-Jurgen E. Hess, Old Lyme, Conn., assignors to Pfizer Inc., New York, N.Y.
No Drawing. Application Oct. 26, 1967, Ser. No. 678,191, now Patent No. 3,517,005, which is a continuation-in-part of application Ser. No. 590,494, Oct. 31, 1966. Divided and this application Mar. 12, 1970, Ser. No. 19,082
Int. Cl. A61k 27/00
U.S. Cl. 424—250
23 Claims

ABSTRACT OF THE DISCLOSURE

Substituted 6,7-dialkoxyquinazolines, 4-(6,7-dialkoxyquinolin-4-yl)-piperazine-1 - carboxylic acid, esters and 1-amino-6,7-dialkoxyisoquinolines and their pharmaceutically-acceptable acid addition salts. Compounds manifest bronchodilator activity and antihypertensive response with minimal adverse effects upon administration to afflicted subjects.

CROSS REFERENCE TO RELATED APPLICATIONS

This application is a division of application Ser. No. 678,191, filed Oct. 26, 1967, now U.S. Patent 3,517,005 which, in turn, is a continuation-in-part of application Ser. No. 590,494, filed Oct. 31, 1966 and now abandoned.

BACKGROUND OF THE INVENTION

This invention relates to certain novel organic nitrogen compounds, and more particularly, it is concerned with various new and useful organic heterocyclic nitrogen compounds which are valuable in alleviating bronchoconstriction in afflicted subjects and in reducing the blood pressure of hypertensive subjects.

Treatment subjects suffering from bronchoconstriction or hypertension requires that the therapeutic agent effectively cause bronchodilation or lower the blood pressure of the treated subject at dosage levels which do not cause other undesirable effects in the subject. The compounds of this invention manifest bronchodilatory and/or hypotensive activity at dosage levels at which no adverse effects are manifested in the treated individual.

SUMMARY OF THE INVENTION

The compounds of this invention are those of the following formulae:

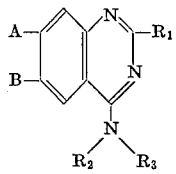

I and

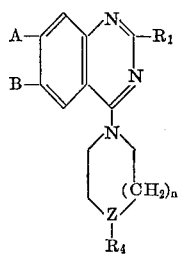

II and

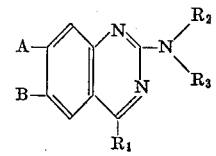

III and

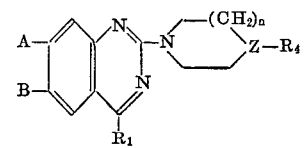

IV and

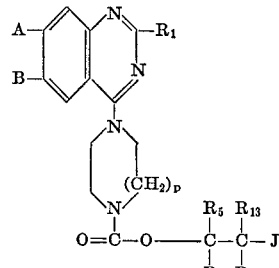

V and

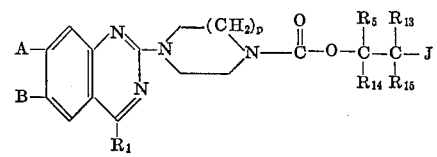

V(A)

and their pharmaceutically-acceptable acid addition salts.

In these compounds A and B may each be alkoxy containing from 1 to 5 carbon atoms, hydrogen, hydroxy, or methyl. When A or B are hydrogen, the other is never hydrogen and A and B, taken together, may be benzo or alkylenedioxy having up to 4 carbon atoms. $R_1$ may be H or alkyl containing from 1 to 6 carbon atoms. $R_2$ and $R_3$ may each be H, phenyl, phenylalkyl, alkyl, alkenyl, hydroxyalkyl or cycloalkyl, the alkyl, alkenyl and cycloalky moieties having up to 6 carbon atoms. Z is —$CH_2$—, O or N, provided that when Z is —$CH_2$— or O, $n$ is equal to one and when Z is N, $n$ is equal to one or two. $R_4$ may be H, alkyl, alkenyl, aryl hydrocarbon, alkylcarbonyl, aryloxycarbonyl, alkenyloxycarbonyl, benzoyl naphthoyl or alkyloxycarbonyl, the alkyl and alkenyl moieties having up to 6 carbon atoms and the aryl hydrocarbon moiety having up to 10 carbon atoms. $R_5$, $R_{13}$, $R_{14}$ and $R_{15}$ may each be H, alkyl containing from 1 to 4 carbon atoms or hydroxymethyl. $R_5$ and $R_{13}$, taken together, may be cycloalkyl having from 4 to 7 carbon atoms. J may be H, hydroxy, formyloxy, acyloxy containing from 2 to 5 carbon atoms, aroyloxy containing up to 11 carbon atoms, alkoxy containing from 1 to 4 carbon atoms, aryloxy containing up to 10 carbon atoms, chloro, bromo formamido, alkylamido having up to 4 carbon atoms in the alkyl group, arylamido having up to 10 carbon atoms in the aryl group, or amino, containing up to two substituents. Each amino substituent may be hydrogen, alkyl having up to 4 carbon atoms or aryl containing up to 10 carbon atoms, and the two substituents, taken together, may be cycloalkyl containing from 4 to 7 carbon atoms and $p$ may be one or two.

These compounds are useful as bronchodilators and as anti-hypertensive agents and are also useful in other manners.

The compounds which are particularly useful in effecting hypotensive action are those numbered I and III while compounds of all the depicted formulae exhibit useful broncholidator activity. Compounds which are preferred as bronchodilators are the disclosed 6,7-dimethoxyquinazolines, the 6,7-ethylene dioxyquinazolines the 6,7-di-iso-propoxyquinazolines as well as the 7-methoxyquinazolines. Of particular interest as bronchodilators are the compound 4-amino-6,7 - dimethoxyquinazoline, the compound 2-ethyl-4-amino - 6,7 - dimethoxyquinazoline, the compound 4-(6,7 - dimethoxyquinazolin-4-yl)-piperazine-1 - carboxylic acid, isobutyl ester, the compound 4-(2-n-propyl-6,7-dimethoxyquinazolin-4-yl)-piperazine - 1 - carboxylic acid, isobutyl ester, the compound 4-(2-methyl-6,7-dimethoxyquinazolin-4-yl) - piperazine - 1-carboxylic acid, isobutyl ester the compound 4-(2-ethyl-6,7-dimethoxyquinazolin-4-yl) - piperazine - 1-carboxylic acid, isobutyl ester, the compound 4-(6,7-dimethoxyquinazolin-4-yl)-piperazine-1-carboxylic acid, 2 - methyl - 2-hydroxypropyl ester, the compound 4-(6,7-dimethoxyquinazolin-4-yl)-piperazine-1-carboxylic acid, 2-methyl-2-chloropropyl ester, and the compound 4-(6,7 - dimethoxyquinazolin-4-piperazine-1-carboxylic acid, 2 - methyl - 2-chloropropyl ester.

These compounds are also useful in effecting smooth muscle relaxation in subjects to which the compounds are administered.

Of particular interest as hypotensive agents are the compound 2-ethyl-4-amino-6,7-dimethoxyquinazoline, the compound 2-methyl-4-amino-6,7-dimethoxy - quinazoline, the compound 4-amino-6,7-dimethoxyquinazoline, and the compound 2-n-propyl-4-amino-6,7-dimethoxyquinazoline.

Other compounds of this invention are those of the formula:

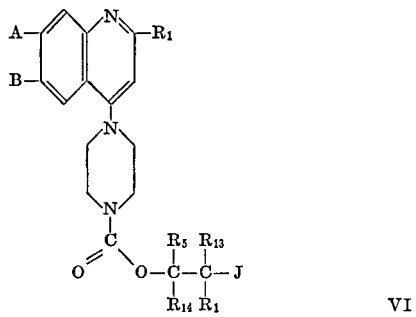

VI and their pharmaceutically-acceptable acid addition salts.

In these compounds of Formula VI, A and B may each be alkoxy containing from 1 to 5 carbon atoms, hydrogen, hydroxy, or methyl. When A or B are hydrogen, the other is never hydrogen. A and B, taken together, may be benzo or alkylenedioxy having up to 4 carbon atoms. $R_1$ may be H or alkyl containing from 1 to 6 carbon atoms. $R_5$, $R_{13}$, $R_{14}$ and $R_{15}$ each may be H, alkyl containing from 1 to 4 carbon atoms or hydroxymethyl and $R_5$ and $R_{13}$, taken together, may be cycloalkyl having from 4 to 7 carbon atoms. J may be H, hydroxy, formyloxy, acyloxy containing from 2 to 5 carbon atoms, aroyloxy containing up to 11 carbon atoms, alkoxy containing from 1 to 4 carbon atoms, aryloxy containing up to 10 carbon atoms, chloro, bromo, formamido, alkylamido having up to 4 carbon atoms in the alkyl group, arylamido having up to 10 carbon atoms in the aryl group, or amino, containing up to two substituents. Each amino substituent may be hydrogen, alkyl having up to 4 carbon atoms or aryl containing up to 10 carbon atoms. The two substituents, taken together, may be cycloalkyl containing from 4 to 7 carbon atoms.

These compounds are useful as bronchodilators and as smooth muscle relaxants. Of particular interest as bronchodilators are the compound 4-(6,7-dimethoxyquinolin-4-yl)-piperazine-1-carboxylic acid, isobutyl ester, and the compound 4-(6,7-dimethoxyquinolin-4-yl) - piperazine-1-carboxylic acid, 2-methyl-2-hydroxypropyl ester.

Other compounds of this invention are those of the formulae:

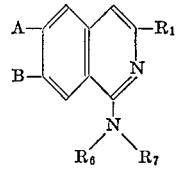

VII and

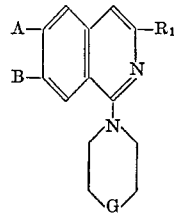

VIII and

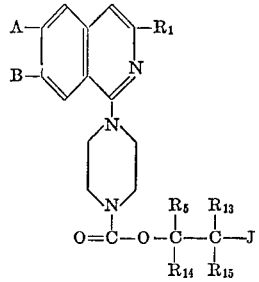

IX and their pharmaceutically-acceptable acid addition salts.

In the compounds of Formulae VII, VIII and IX, A and B may each be alkoxy containing from 1 to 5 carbon atoms, hydrogen, hydroxy, or methyl. When A or B are hydrogen, the other is never hydrogen. A and B, taken together may be benzo or alkylenedioxy having up to 4 carbon atoms. $R_1$ is H or alkyl containing from 1 to 6 carbon atoms. $R_6$ and $R_7$ may each be H, alkyl or alkenyl containing up to 6 carbon atoms, aryl hydrocarbon containing up to 10 carbon atoms, aralkyl hydrocarbon containing up to 3 carbon atoms in the alkyl moiety and 7 carbon atoms in the aryl moiety, or β-hydroxyethyl. When $R_6$ and $R_7$ are aryl or aralkyl, the aryl moiety may be substituted with up to 3 substituents which may be halogen or alkoxy containing up to 4 carbon atoms. $R_6$ and $R_7$, taken together, may be cycloalkyl containing from 3 to 7 carbon atoms.

G may be oxygen, sulfur, amino, alkylamino having up to 6 carbon atoms in the alkyl group, alkenylamino having from 3 to 6 carbon atoms in the alkenyl moiety, unsubstituted aryl hydrocarbon amino having up to 10 carbon atoms in the aryl moiety, acylamino having up to 6 carbon atoms in the acyl moiety, aroylamino having up to 11 carbon atoms in the aroyl moiety, carbalkoxyamino having up to 6 carbon atoms in the alkyl moiety, carbalkenyloxyamino having up to 6 carbon atoms in the alkenyl moiety or carbaryloxyamino having up to 10 carbon atoms in the aryl moiety. $R_5$, $R_{13}$, $R_{14}$ and $R_{15}$ may each be H, alkyl containing from 1 to 4 carbon atoms or hydroxymethyl. $R_5$ and $R_{13}$, taken together, may be cycloalkyl having from 4 to 7 carbon atoms.

J may be H, hydroxy, formyloxy, acyloxy containing from 2 to 5 carbon atoms, aroyloxy containing up to 11 carbon atoms, alkoxy containing from 1 to 4 carbon atoms, aryloxy containing up to 10 carbon atoms, chloro, bromo, formamido, alkylamino having up to 4 carbon atoms in the alkyl group, arylamido having up to 10 carbon atoms in the aryl group or amino, containing up to two substituents. Each amino substituent may be hydrogen, alkyl having up to 4 carbon atoms or aryl containing up to 10 carbon atoms. The two substituents, taken together, may be cycloalkyl containing from 4 to 7 carbon atoms.

These compounds of Formulae VII, VIII and IX are useful as bronchodilators and as smooth muscle relaxants. Particularly preferred as bronchodilators are the compound 4-(6,7-dimethoxyisoquinolin-1-yl) - piperazine-1-carboxylic acid, isobutyl ester, the compound 4-(6,7-dimethoxyisoquinolin-1-yl) - piperazine-1-carboxylic acid, ethyl ester, the compound 4-(6,7-dimethoxy-isoquinolin-1-yl)-piperazine - 1 - carboxylic acid, 2-methyl-2-hydroxypropyl ester, and the compound 4-ethylamino-6,7-dimethoxyisoquinoline.

DETAILED DESCRIPTION OF THE INVENTION

This invention concerns the compounds of Formulae I, II, III, IV, V, VA, VI, VII, VIII and XI.

Compounds I, II and V may be prepared from the appropriate substituted o-aminobenzoic acid amides. The amides are reacted with appropriate alkanoyl chlorides to form substituted o-alkanamido benzoic acid amides which are then cyclized in alkaline ethanol to 2-alkyl-6,7-dialkoxy-4(3H)-quinazolinone. Where the 2-substituent is to be hydrogen, the substituted o-aminobenzoic acid amide may be cyclized by reacting it with formic acid. The 2-substituent on the resultant quinazoline is controlled by the nature of the alkanoyl chloride which is used. The 6- and 7-substituents on the resultant quinazoline are determined by the nature of the substituents on the original substituted o-aminobenzoic acid amide. The resultant quinazolinone is chlorinated to 2-alkyl-4-chloro-6,7-dialkoxyquinazoline using phosphorous oxychloride.

The 2-alkyl-4-chloro-6,7-dialkoxyquinazoline is aminated to the desired 2-alkyl-4-imino-6,7-dialkoxyquinazoline by reacting it with the appropriate amine or ammonia. The structure of the 4-substituent on the quinazoline is determined by the structure of the amine with which the 4-chloroquinazoline is reacted. The amination generally is carried out in an aqueous or organic solvent and, while ethanol is a preferred solvent, other polar solvents such as dimethylformamide, dioxane, tetrahydrofuran or methanol may be used. A molar excess of amine is generally employed. The reaction mixture is heated from 75 to 150° C. and from 1 to 13 hours under reflux conditions or in a pressure vessel. Preferred reaction times and temperatures are from 75 to 85° C. and from 2.5 to 3.5 hours for alkylamino or heterocyclic amino substituents and from 130 to 150° C. and from 11 to 13 hours where ammonia in ethanol is used.

The reaction sequences are shown for 4-(6,7-dimethoxyquinazoline-4-yl)-piperazine-1-carboxylic acid, isobutyl ester and for 2-propyl-4-amino-6,7-dimethoxyquinazoline.

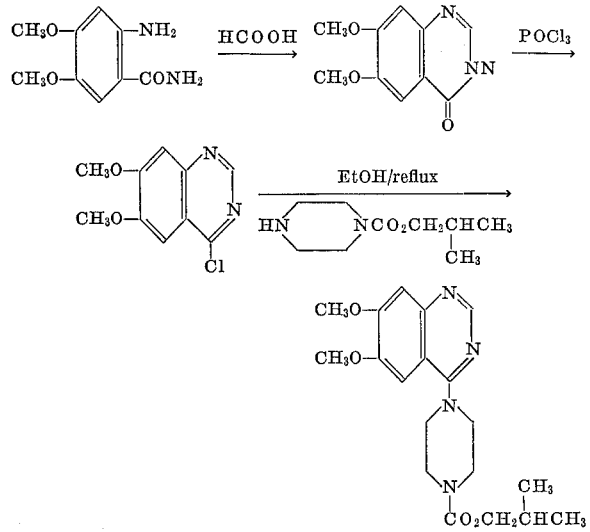

The reaction sequence for 2-propyl-4-amino-6,7-dimethoxyquinazoline is as follows:

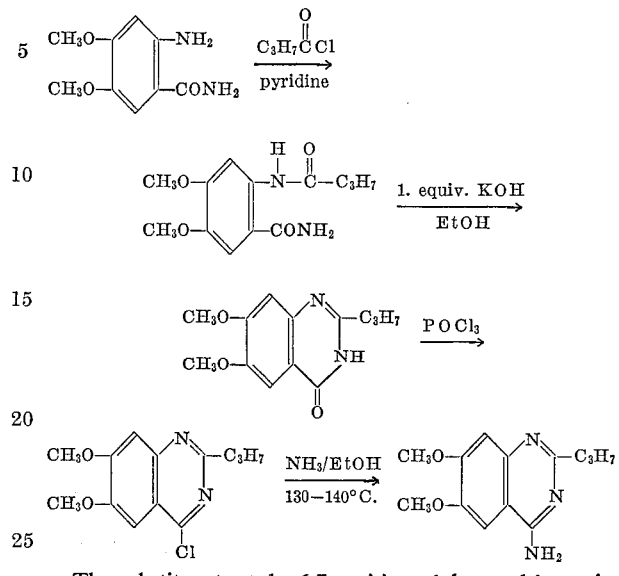

The substituents at the 6,7-position of the resulting quinazoline are controlled by the substituents on the original o-amino benzoic acid amide. Typical quinazolines, substituted at the 6- or 7-positions or both which are obtainable from substituted o-aminobenzoic acid amides by the cyclization procedure outlined herein are shown in Table I with their starting compounds.

Table I.—Substituted Quinazolines

| Starting Compound: | Substituents |
|---|---|
| 4-methoxyanthranilamide | 7-methoxy-. |
| 5-methoxyanthranilamide | 6-methoxy-. |
| 6-aminoveratramide | 6,7-dimethoxy-. |
| 4-ethoxyanthranilamide | 7-ethoxy-. |
| 4,5-di-n-propyloxyanthranilamide | 6,7-di-n-propyloxy. |

The 2-alkyl-4-amino-6,7-substituted quinazolines of Formulae I, II and V may also be prepared by use of the appropriate 2-alkyl-4-bromo-quinazolines, the appropriate 2-alkyl-4-alkoxy-quinazolines and the appropriate 2-alkyl-4-thioalkoxy-quinazolines in place of the 2-alkyl-4-chloroquinazolines used in the procedures outlined above. When these compounds are used in place of the 4-chloro compounds, the reaction times and reaction conditions may differ from those given for the 4-chloro compounds. Those skilled in the art will easily be able to determine the appropriate reaction conditions where the 4-bromo, 4-alkoxy or 4-thioalkoxy compounds are used. The preferred reactants are the 4-bromo or 4-chloro quinazolines.

Compounds III, IV and VA can be prepared from 2,4-dichloro-6,7-dialkoxy-quinazolines. These are prepared by the procedure given by F. H. S. Curd et al., J. Chem. Soc. (London), 1759 (1948). Where the 2-amino group is unsubstituted, ($R_2$, $R_3$ are hydrogen) an alternative method of preparation for compound III may be used which involves the cyclization of the substituted 2-acylanilines with cyanamide.

Where compounds III, IV and VA are to be prepared from 2,4-dichloro-6,7-dialkoxyquinazolines, the 4-chloro substituent is replaced by a diester moiety which is decarboxylated to the desired alkyl substituent at the 4-position. The nature of the 4-alkyl substituent is controlled by the ester which is used to replace the 4-chloro group. The replacement reaction, which utilizes the appropriate diethyl α-alkylmalonate, is accomplished in a solution of sodium hydride dissolved in dimethylformamide. Diethyl α-alkyl sodium malonate is formed and reacts at the 4-position to replace the 4-chloro substituent on the quinazoline. The reaction may be carried out at temperatures from 40 to 100° C. and over a period from about 1 to about 60 hours. A preferred temperature range is from 50 to 70° C. and a preferred range of reaction duration is from 35 to 45 hours at these temperatures. Yields of desired product range from 40 to 80 percent and 60 percent is typical. The diethyl 4-(2-chloro-6,7-dialkoxyquinazoline)-α-alkyl malonate is decarboxylated to 2-chloro-4-alkyl-6,7-dialkoxyquinazoline using sodium hydroxide or another suitable alkaline agent.

The 2-chloro position is aminated using ammonia or the appropriate amine dissolved in ethanol or another solvent. Suitable solvents include dimethylformamide, tetrahydrofuran and methanol. Where ethanol is used the reaction temperature may be from 100 to 150° C. and 125–135° C. is a preferred temperature range. Typical yields are from 40 to 60 percent. The structure of the 2-amino substituent is completely determined by the nature of the amine which is used.

Compounds III, IV and VA may also be prepared from the appropriate 2,4-dibromo-6,7-substituted quinazolines, the appropriate 2,4-dialkoxy-quinazolines and the appropriate 2,4-dithioalkoxy-quinazolines. When these compounds are used in place of the 2,4-dichloro-quinazolines, the reaction times and reaction conditions may differ from those given for the 2,4- dichlorocompounds. Those skilled in the art will easily be able to determine the appropriate reaction conditions where the 2,4-dibromo, the 2,4-dialkoxy or the 2,4-dithioalkoxy quinazolines are used in place of the 2,4-dichloro quinazolines. The use of the 2,4-dichloro quinazolines is the preferred synthesis route.

The hydrochloride salt of the resultant 2-amino-4-alkyl-6,7-dialkoxy-quinazoline may be prepared by dissolving the quinazoline in ethanol or a mixture or ethanol and ethyl ether and passing hydrogen chloride gas through the solution for a sufficient period. The hydrochloride salt is thus formed.

Where Compound III is to be prepared from the appropriate 2-acylanilines, the 2-substituent on the resulting quinazoline is amino. The 2-acylaniline is reacted with cyanamide at a temperature of 50 to 75° C. for a period of from 0.5 to 2 hours. A preferable temperature range is 50 to 60° C. and a preferable reaction duration, over this temperature range, is 30 to 60 minutes.

The compounds of Formula VI are prepared from the corresponding 4-chloro-6,7-substituted quinolines. These latter compounds are prepared by the method given by B. Riegel et al., J. Am. Chem. Soc., 68, 1264 (1946). The nature of the 6 -and 7-substituents is determined by the original 3,4-disubstituted aniline which is used to prepare the 6,7-substituted quinoline. The nature of the 2-substituent is determined by the malonic ester which is used to cyclize the 3,4-disubstituted aniline.

The compounds of Formula VI are prepared by reacting the 4-chloro-6,7-substituted quinoline with an appropriate piperazine-1-carboxylic acid ester. This reaction may be carried out in an appropriate aqueous or organic solvent and, while ethanol is a preferred solvent, other polar solvents such as dimethylformamide, dioxane, tetrahydrofuran or methanol may be used. A molar excess of the piperazine acid ester may be employed. The reaction mixture is heated at a temperature from 100° C. to 170° C. for a period ranging from one to sixteen hours. Preferred reaction times are from 1.5 to 2.5 hours and preferred temperatures range from 120° C. to 140° C., where ethanol is the solvent.

An alternative procedure may be used which involves the preparation of 4-piperazinyl quinoline, as an intermediate. The compounds of Formula VI are prepared from the intermediate, as indicated below.

The appropriate 4-bromo quinolines, 4-alkoxy quinolines and 4-thioalkoxy quinolines may be used in place of the 4-chloro quinolines to prepare the compounds of Formula VI. When these compounds are used, the reaction duration and conditions may slightly differ from those used when the 4-chloro quinolines are the starting compounds. Those skilled in the art will easily be able to determine the appropriate reaction conditions for use where the 4-bromo, 4-alkoxy or 4-thioalkoxy quinolines are used as reactants. The preferred reactants are the 4-chloro quinolines.

Compounds VII, VIII and IX may be prepared from the appropriate 1 - chloro - 6,7 - substituted isoquinolines. These latter compounds may be prepared by a method derived from that given by E. L. Anderson et al., J. Am. Pharm. Assoc., Sci. Ed., 41, 643 (1952).

The preparation method involves the reaction of a substituted phenethylamine with ethyl chloroformate, in benzene, to form the substituted phenethyl carbamic acid, ethyl ester. This latter compound is cyclized by treatment with polyphosphoric acid at about 140° C. for 30 minutes to form the 3,4-dihydro-1(2H)-isoquinolinone which is converted to the 1(2H)-isoquinolinone by use of a palladium on carbon catalyst. This reaction is continued until hydrogen evolution ceases. The 1(2H)-isoquinolinone is converted to the 1-chloro-isoquinoline by reaction with phosphorus oxychloride. The 1-chloro-isoquinoline is reacted with the appropriate amine to form the compounds of Formulae VII, VIII, and IX.

A typical reaction scheme may be shown as:

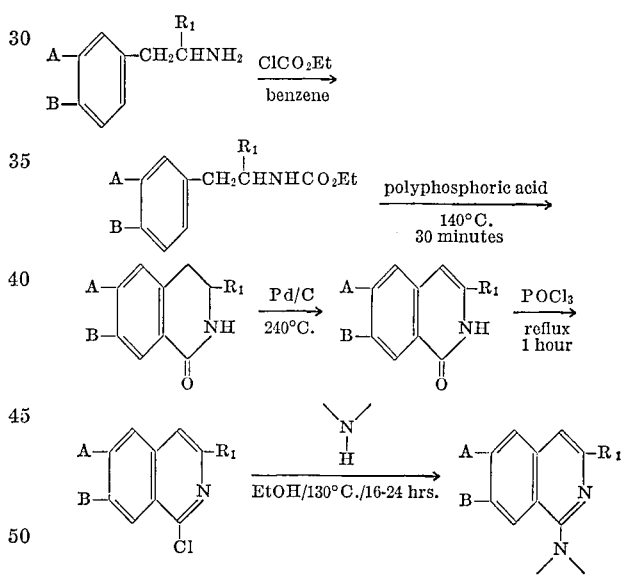

As is apparent from the reaction scheme set out above, the substituents at the 3-, 6- and 7-positions ($R_1$, A and B) are determined by the nature of the original substituted phenethylamine and the amino substituent at the 1-position is determined by the amine used in the final reaction step. In the compounds of Formula IX, where the substituents $R_5$, $R_{13}$, $R_{14}$, $R_{15}$ and J are complex, it may be necessary or preferable to form the final compound in two or more steps, from the 1-chloro compounds, as is outlined below.

The amination of the 1-chloro isoquinoline is generally carried out in an aqueous or organic solvent and, while ethanol is preferred as a solvent, other polar solvents such as dimethylformamide, dioxane, tetrahydrofuran or methanol may be used. A molar excess of amine or base may be used advantageously. The amination reaction takes place at a temperature ranging from 100° C. to 200° C. and a reaction duration of 10 to 36 hours. Preferred reaction temperatures are 120° C. to 140° C. and preferred reaction times range from 16 to 24 hours when ethanol is used as a solvent.

The compounds of Formulae VII, VIII and IX may also be produced using the appropriate 1-bromo isoquinoline, the 1-alkoxy isoquinoline or the 1-thioalkoxy isoquinoline in place of the preferred 1-chloro compound. Where these compounds are used in place of the 1-chloro isoquinolines, the reaction conditions may differ from those given above for the 1-chloro compound. Those skilled in the art will easily be able to determine appropriate reaction temperatures and durations for producing the compounds of Formulae VII, VIII and IX from the 1-bromo, 1-alkoxy or 1-thioalkoxy isoquinolines.

The methods used to prepare the compounds of Formulae VII, VIII and IX may also be used to prepare compounds of the following Formula X:

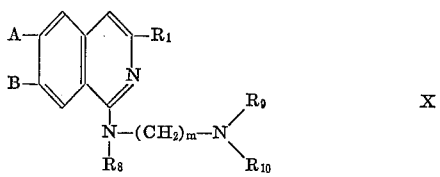

where A, B and $R_1$ are as defined for the compounds of Formulae VII, VIII and IX and $R_8$, $R_9$ and $R_{10}$ are each H or alkyl having up to 6 carbon atoms. The number of methylene groups, $m$, is from 2 to 5. These compounds are useful as intermediates in preparing the compounds of Formulae VII, VIII and IX.

Where compounds of Formulae II, IV, V, VA, VI and IX are produced it is often preferable to prepare the final compound from the chloroderivative in two or more steps.

Nevertheless, the final compound may, in some cases, be more easily prepared in a single step by direct amination of the chloro derivative. Thus, the 4-(2-alkyl-6,7-dimethoxyquinazolin-4-yl)-piperazine - 1 - carboxylic acid, isobutyl esters are prepared, directly, by reacting the 2-alkyl-4-chloro-6,7-dimethoxyquinazolines with piperazine-1-carboxylic acid, isobutyl ester. Similarly, the 4-(6,7-dimethoxyquinolin-4-yl)-piperazine - 1 - carboxylic acid, isobutyl ester is prepared, directly, by reacting 4-chloro-6,7-dimethoxyquinoline with the appropriate ester.

Suitable amino compounds, useful for producing the compounds of this invention, in one or more steps, from the chloro derivatives may be prepared by the following scheme:

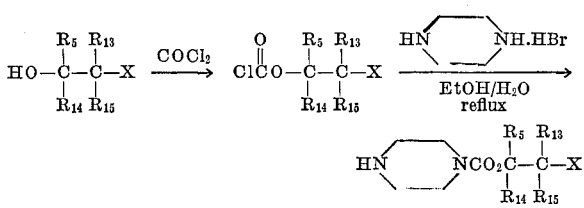

In these reactions X is chloro or bromo. The last compound is reacted directly with the 4-chloro quinazoline, the 4-chloro-quinoline or the 1-chloro-isoquinoline to form the compounds of this invention where J is chloro or bromo.

The compound where J is chloro or bromo may then be converted to the corresponding compound, where J is hydroxyl, by treatment with 0.1 N hydrochloric acid. The compound where J is hydroxyl may then be converted to the compounds where J is acyloxy or aroyloxy by use of the appropriate acid chloride.

The compounds of Formulae II, IV, V, VA, VI, and IX may also be prepared in several stages, analogously to the scheme shown below:

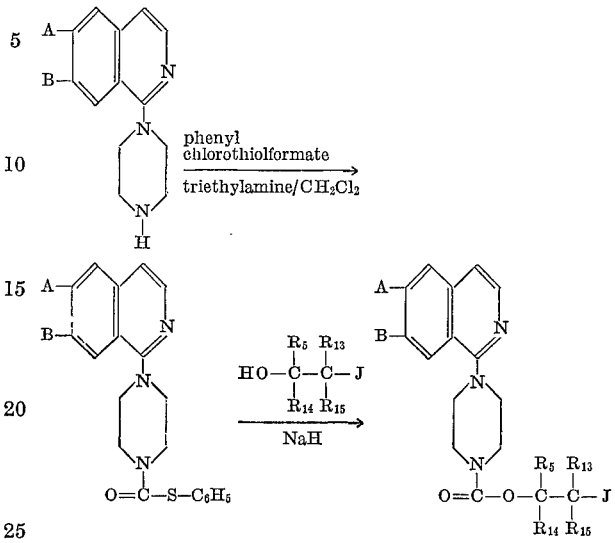

Compounds where J is alkylamido, arylamido or formamido may be produced from compounds where J is unsubstituted amino by treatment of the latter compounds with the appropriate acid chloride.

Variations of these procedures which also may be used to prepare the compounds of this invention from other similar compounds and by other methods will be obvious to those skilled in the art.

The well-known procedures for preparing salts of basic compounds are also applicable to the preparation of the compounds of this invention and are illustrated in the examples below. Such salts may be formed with both pharmaceutically-acceptable and pharmaceutically-unacceptable acids. By "pharmaceutically-acceptable" is meant those salt-forming acids which do not substantially increase the toxicity of the basic compound. The preferred salts, which are of particular value in therapy, are the acid addition salts. These include salts of mineral acids such as hydrochloric, hydriodic, hydrobromic, phosphoric, metaphosphoric, and sulfuric acids, as well as salts of organic acids such as tartaric, acetic, citric, malic, maleic, methanesulfonic, ethansulfonic, benzenesulfonic, para-toluenesulfonic and gluconic as well as other suitable acids.

The pharmaceutically-unacceptable acid addition salts, while not useful for therapy, are valuable for use in the isolation and purification of these newly discovered compounds. Furthermore, they are useful for the preparation of the therapeutically valuable pharmaceutically-acceptable salts. Of this group, the more common salts include those formed with hydrofluoric and perchloric acids. Hydrofluoride salts are particularly useful for the preparation of the pharmaceutically-acceptable salts.

The compounds of this invention may be administered to hypertensive subjects or subjects suffering from bronchoconstriction in order to alleviate these conditions. The bronchoconstriction may be functional or may be caused by allergenic conditions or asthmatic conditions or may have come about as the result of a microbial infection. The compounds of this invention may be administered alone or in combinations with pharmaceutically-acceptable carriers. The proportion of the active ingredient to carrier is determined by the solubility and chemical nature of the therapeutic compounds, the chosen route of administration and the needs of the standard pharmaceutical practice. For example, where these compounds are administered in tablet form, excipients such as lactose, sodium citrate, calcium carbonate and dicalcium phosphate may be used. Various disintegrants such as starch, alginic acids, and certain complex silicates, together with lubricating agents such as magnesium stearate, sodium lauryl sulphate and talc, may also be used in producing tablets for the oral administration of these compounds. For oral administration in capsule form, lactose and high molecular weight polyethylene glycols are preferred materials for use as pharmaceutically-acceptable carriers. Where aqueous suspensions are to be used for oral administration, the compounds of this invention may be combined with emulsifying or suspending agents. Diluents such as ethanol, propylene glycol, glycerine and their combinations may be employed as well as other materials. Solutions of the compounds of this invention in combination with other solutes such as glucose or saline may be used where the compounds are to be administered parenterally. Such aqueous solutions should be suitably buffered, if necessary, to render them isotonic.

The compounds of this invention may be administered to subjects suffering from bronchoconstriction by means of inhalators or other devices which permit the active compounds to come into direct contact with the constricted areas of the tissues of the subject.

The dosage required to reduce the blood pressure of hypertensive subjects and to relieve the bronchoconstriction in affected subjects will be determined by the nature and the extent of the hypertension or bronchoconstriction. Generally, small dosages will be administered initially with gradual increase in dosage until the optimal dosage level is determined for the particular subject under treatment. It will generally be found that when the composition is administered orally, larger quantities of the active ingredient will be required in order to produce the same level of blood pressure reduction or bronchoconstruction relief as would be produced by the smaller quantity of active compound which is administered parenterally. In general, dosages will be in the range from about 0.02 to 200 milligrams of active ingredient per kilogram of body weight of subject, administered in single or multiple dosage units. Dosages at this level will effectively reduce blood pressure in hypertensive subjects and relieve bronchoconstriction in subjects suffering therefrom. Tablets containing 0.1 to 50 milligrams of active ingredient are found to be particularly useful.

The therapeutic effects of the compounds of this invention have been evaluated in guinea pigs and dogs. It was found that the compounds manifested therapeutic action over extended periods of time, were easily absorbed into the treated subjects upon administration and showed relatively small effects on the central nervous systems of the treated subjects. Interestingly, the compound 4-(6,7-dimethoxyquinazolin-4-yl)-piperazine-1-carboxylic acid, 2-methyl-2-hydroxypropyl ester is found in the urine of dogs to which the compound 4-(6,7-dimethoxyquinazolin-4-yl)-piperazine-1-carboxylic acid, isobutyl ester has been administered. The former compound, wherein J is hydroxy, appears to be a metabolite of the latter compound, where J is hydrogen. The effectiveness of the compounds of this invention as therapeutic agents was measured with respect to theophylline, a known bronchodilator and with respect to known hypotensive agents.

The compounds of this invention also have been observed to inhibit the activity of the enzyme phosphodiesterase, which catalyzes the conversion of adenosine-3',5'-monophosphate (3',5'-AMP) to adenosine-5'-monophosphate (5'-AMP). Thus, in systems containing phosphodiesterase in which it is desirable to maintain a high 3',5'-AMP level, the instant compounds might be used to great advantage. The ability of the novel compounds to inhibit the enzyme activity is of significance since it is well known that the mononucleotide 3',5'-AMP is an important regular of numerous cellular and tissue processes, e.g. smooth muscle relaxation, lipolysis and glycolysis. The instant compounds are tissue-specific inhibitors of the enzyme, i.e., they will inhibit the enzyme in certain tissues and not in others; therefore, when it is desirable to raise the 3',5'-AMP level in only one of several types of tissues which are present, use of the instant compounds is particularly advantageous.

This phosphodiesterase inhibition is also significant for the relaxation of bronchial and peripheral vascular smooth muscle. Many of the novel compounds have been evaluated with respect to their ability to inhibit phosphodiesterase activity with a view to their potential activity as bronchodilators, smooth muscle relaxants or antihypertensives.

It will be understood that various changes in the details, materials and steps which have been herein described and illustrated in order to explain the nature of this invention may be made by those skilled in the art within the principal scope of the invention.

The following examples are given by way of illustration only and are not to be construed as limiting the scope of this invention in any way.

Example I.—Preparation of 4-(2-ethyl-6,7-dimethoxyquinazoline-4-yl)-piperazine-1-carboxylic acid, isobutyl ester Part A: Preparation of N-carbethoxy-6-aminoveratric acid.—A quantity of ethyl chloroformate totaling 20.0 grams (0.185 mole) was added, dropwise, to a solution of 35.0 grams (0.177 mole) of 6-aminoveratric acid dissolved in 100 ml. of pyridine. The addition was accomplished over a 30 minute period and the temperature of the reacting mixture was always held below 60° C. The precipitation of the product began after about half of the dropwise addition had taken place. After completion of the addition, the mixture was cooled to room temperature and poured into 400 ml. of water. This mixture was filtered, washed with three 200 ml. portions of water, and dried over phosphorus pentoxide. The procedure yielded 46.0 grams of N-carbethoxy-6-aminoveratric acid as a white solid with a melting point of 211–213° C. The procedure produced a yield of 96.5 percent.

Part B: Preparation of 6-aminoveratramide.—A slurry of 46.0 grams (0.171 mole) of N-carbethoxy-6-aminoveratric acid in 100 ml. of thionyl chloride was stirred until the exothermic reaction had subsided. The mixture was then heated for 15 minutes at reflux. The slurry was diluted with hexane and refluxed for 15 minutes after which the resultant mixture was filtered to yield 45.0 grams of crude 4,5-dimethoxy-N-carboxyanthranilic anhydride. The crude product of this step evidenced a melting point of 225–256° C. and was used, without purification, as follows.

A slurry of 35.0 grams of the crude 4,5-dimethoxy-N-carboxyanthranilic anhydride with 600 ml. of ethanol saturated with ammonia was stirred at reflux for 30 minutes while a stream of ammonia was passed through the mixture. A complete solution resulted after 15 minutes. The solution was cooled to room temperature and filtered and the filtrate was concentrated to separate 25.4 grams of crystalline 6-aminoveratramide. This sample evidenced a melting point of 133–136° C. Further crystallization of the product from benzene yielded an analytical sample which evidenced a melting point of 147–148° C.

Analysis.—Calc'd for $C_9H_{12}H_2O_3$ (percent): C, 55.09; H, 6.17; N, 14.28. Found (percent): C, 55.24; H, 5.83; N, 14.54.

Part C: Preparation of 6-propionamido-veratramide.— A dropwise addition of 10.1 grams (0.1 mole) of propionyl chloride was made to a solution of 19.6 grams (0.1 mole) of 6-amino-veratramide in 50 ml. of pyridine. The solution was held at a temperature below 10° C. during the addition. Precipitation was initiated about 5 minutes after the completion of the addition and the resultant mixture was permitted to attain room temperature. The mixture was combined with 400 ml. of water, with constant stirring, and the crystalline product was removed by filtration. The filter cake was washed with water and then dried over phosphorus pentoxide. This procedure afforded 21.6 grams of 6-propionamido-veratramide which was separated as a white amorphous solid. The melting point of this solid was 196–197° C. and it represented a yield of 86.5 percent. Recrystallization of a 2.5 gram portion of the white solid from 60 ml. of methanol yielded 2.3 grams of white crystals which were used as the analytical sample. The recrystallized sample had a melting point of 196–197° C., and was found to be homogeneous by thin layer chromatography.

*Analysis.*—Calc'd for $C_{12}H_{16}N_2O_4$ (percent): C, 57.13; H, 6.39; N, 11.11. Found (percent): C, 57.09; H. 6.27; N, 11.04.

Part D: Preparation of 2-ethyl-6,7-dimethoxy-4(3H)-quinazolinone.—A mixture containing 17.1 grams (0.068 mole) of 6-propionamido-veratramide, 4.45 grams (0.079 mole) of potassium hydroxide and 100 ml. of absolute ethanol was stirred and refluxed under a nitrogen atmosphere for 90 minutes. The resultant clear yellow solution was evaporated to remove the bulk of the ethanol and the residue was added to 500 ml. of water and acidified with glacial acetic acid to pH of 6. The mixture was filtered and the filter cake was washed with ethanol and water. The solid was dried over phosphorus pentoxide and 16.0 grams of product were obtained as a white, microcrystalline solid. The white solid, which represented a yield of 100 percent, had a melting point of 252–253° C. and was homogeneous by thin layer chromatography.

Part E: Preparation of 2-ethyl-4-chloro-6,7-dimethoxyquinazoline.—A mixture of 16.0 gram (0.068 mole) of 2-ethyl-6,7-dimethoxy-4-(3H-quinazolinone in 160 ml. of phosphorus oxychloride was stirred with reflux for 3.5 hours. The resulting solution, which was formed after 2.5 hours of stirring at reflux, was concentrated to an oily residue which was dissolved in 500 ml. of methylene chloride. This solution was added to 500 ml. of concentrated ammonium hydroxide solution with constant stirring. The methylene chloride layer was drawn off and the resultant aqueous phase was extracted with two 200 ml. portions of methylene chloride. The combined organic phases were washed with two 200 ml. portions of water and dried over sodium sulfate. Evaporation of the methylene chloride yielded 15.3 grams of 2-ethyl-4-chloro-6,7-dimethoxyquinazoline as a homogeneous yellow amorphous solid. The solid evidenced a melting point of 150–154° C. and represented a yield of 89 percent. An analytical sample was obtained by recrystallization from a methylene chloride-hexane mixture. The product, which was separated as small colorless needles, evidenced a melting point of 155–156.5° C. and was homogeneous by thin layer chromatography.

Part F: Preparation of 4-(2-ethyl-6,7-dimethoxyquinazolin-4-yl)-piperazine-1-carboxylic acid, isobutyl ester.—A mixture of 5.0 grams (0.02 mole) of 2-ethyl-4-chloro-6,7-dimethoxyquinazoline and 7.43 grams (0.04 mole) of piperazine-1-carboxylic acid, isobutyl ester was dissolved in 50 ml. of absolute ethanol and was stirred at reflux for 1 hour. The resultant clear solution was concentrated to a crystalline residue and mixed with 150 ml. of boiling hexane. The resultant mixture was filtered and the filtrate was concentrated. On cooling, 6.4 grams of 4-(2-ethyl-6,7-dimethoxyquinazolin-4-yl)-piperazine-1-carboxylic acid, isobutyl ester was deposited as a white microcrystalline solid which evidenced a melting point of 98–101° C. and was homogeneous by thin layer chromatography. This amount represented a yield of 79.5 percent. An analytical sample was obtained by a further recrystallization from hexane to yield a product comprised of white needles which evidenced a melting point of 96–97° C.

Example II.—Preparation of 4-(2-ethyl-6,7-dimethoxyquinazolin-4-yl)-piperazine-1-carboxylic acid, isobutyl ester hydrochloride The free base was dissolved in ethyl acetate and anhydrous hydrogen chloride was passed into the solution to yield the hydrochloride as a white solid with a melting point of 218–220° C. which temperature was also the decomposition point. The yield in this procedure was 96.5 percent.

Example III.—Preparation of 2-ethyl-4-amino-6,7-dimethoxyquinazoline

Parts A, B, C, D and E of Example I were repeated to yield 5.0 grams of 2-ethyl-4-chloro-6,7-dimethoxyquinazoline.

A mixture of 5.0 grams (0.02 mole) of 2-ethyl-4-chloro-6,7-dimethoxyquinazoline and 70 ml. of saturated ethanolic ammonia solution was heated at 140° C. for 18 hours. The reaction mixture was then filtered after which the solid material was washed well with ethanol and dried in air to yield 4.1 grams of a crystalline solid which evidenced a melting point of 248–253° C. The crystalline solid was a mixture of the desired product and its hydrochloride salt. The solid was slurried in concentrated ammonium hydroxide, filtered, and recrystallized from 75 ml. of ethanol to separate 2.6 grams of a white crystalline solid which evidenced a melting point of 238–239° C. The white crystalline solid, which represented a yield of 56 percent, was homogeneous by thin layer chromatography.

*Analysis.*—Calc'd for $C_{12}H_5N_3C_2$ (percent): C, 61.78; H, 6.48; N, 18.02. Found (percent): C, 61.75; H, 6.58; N, 17.69.

Example IV.—Preparation of 4-amino-2-methyl-6,7-dimethoxyquinazoline hydrochloride A mixture of 5.0 grams (0.0225 mole) of 2-methyl-6,7-dimethoxy-4(3H)-quinazoline (prepared by the method of G. N. Walker, J. Am. Chem. Soc., 77, 6698 (1955)) and 50 ml. of phosphorus oxychloride was stirred at reflux for 35 minutes. The resultant solution was cooled and filtered and the solid was washed with hexane and dried. This procedure yielded 6.7 grams of crude 4-chloro-2-methyl-6,7-dimethoxyquinazoline hydrochloride which evidence a melting point of 183–185° C. The crude material was combined with 70 ml. of ethanol which had been saturated with ammonia and the mixture was heated at 140° C. for 18 hours. The resultant mixture was chilled and filtered. The solid was washed with ethanol and yielded 5.3 grams of 4-amino-2-methyl-6,7-dimethoxyquinazoline hydrochloride. This material was obtained in a yield of 93 percent based on quinazoline and evidenced a melting point of 278–280° C. at which temperature it was found to decompose.

Example V.—Preparation of 4-dimethylamino-6,7-dimethoxyquinazoline

Part A: Preparation of 6,7-dimethoxy-4-(3H)-quinazolinone.—The procedures of Part A and Part B of Example I were carried out to prepare 6-aminoveratramide.

A mixture of 25.4 grams (0.129 mole) of 6-aminoveratramide and 50 ml. of 97 percent formic acid was stirred at reflux for 2 hours to yield complete dissolution of the solid. Upon cooling to room temperature, crystallization occurred. The mixture was diluted with 200 ml. of ethanol and filtered. The filter cake was dried and 21.5 grams of white solid was obtained. The white solid, which evidenced a melting point of 293–294° C., was homogeneous by thin layer chromatography. The yield obtained by this procedure was 81 percent. An analytical sample was obtained by recrystallization from dimethylformamide and white needles, which metled at 296–298° C., were obtained.

*Analysis.*—Calc'd for $C_{10}H_{10}N_2O_3$ (percent): C, 58.25; H, 4.89; N, 13.58. Found (percent): C, 58.10; H, 5.01; N, 13.49.

The hydrochloride was prepared by the method of Example II and evidenced a melting point of 260–261° C.

*Analysis.*—Calc'd for $C_{10}H_{10}N_2O_3HCl$ (percent): C, 49.49; H, 4.57; N, 11.54; Cl, 14.61. Found (percent): C, 49.68; H, 4.76; N, 11.33; Cl, 14.85.

Part B: Preparation of 4-chloro-6,7-dimethoxyquinazoline.—A mixture of 21.5 grams (0.104 mole) of 6,7-dimethoxy-4(3H)-quinazolinone and 215 ml. of phosphorous oxychloride was stirred at reflux for 4 hours. A complete solution resulted after one hour. The solution was concentrated to an oily residue which was added slowly to 400 ml. of concentrated ammonium hydroxide solution. The resultant solid was filtered, washed well with water and dried in air to yield 19.5 grams of solid material which evidenced a melting point of 181–185° C. Upon recrystallization from ethanol, 14.5 grams of a white crystalline product, which evidenced a melting point of 184–186° C., was produced in a yield of 62.5 percent.

Part C: Preparation of 4-dimethylamino-6,7-dimethoxyquinazoline.—A stainless steel pressure bottle was charged with 4.0 grams (0.0179 mole) of 4-chloro-6,7-dimethoxyquinazoline and 90 ml. of a 1:2 dimethylamine-ethanol solution. The bottle was heated at 130° C. for 4 hours. Upon cooling, 1.7 grams of white crystalline 4-dimethylamino-6,7-dimethoxyquinazoline was deposited. The product, which manifested a melting point of 157–159° C., was obtained in a yield of 41 percent. The filtrate was evaporated to dryness and the crude residue, which totalled 3.3 grams, was eluted from a Florisil column with benzene (7× 150 ml. fractions) to separate a further yield of 1.2 grams of crystalline material which manifested a melting point of 158–160° C. This was identical with the first product crop and both crops showed a single spot upon thin layer chromatography. The total yield for this procedure was 70 percent.

Analysis.—Calc'd for $C_{12}H_{15}N_3O_2$ (percent): C, 61.78; H, 6.48; N, 18.02. Found (percent): C, 61.97; H, 6.37; N, 18.05.

Example VI.—Preparation of 4-(6,7-dimethoxyquinazolin - 4 - yl) - piperazine - 1 - carboxylic acid, isobutyl ester The procedures of Parts A and B of Example V were used to prepare 4-chloro-6,7-dimethoxyquinazoline.

A solution containing 10.0 grams (0.0446 mole) of 4 - chloro - 6,7 - dimethoxyquinazoline and 16.6 grams (0.0892 mole) of piperazine-1-carboxylic acid, isobutyl ester dissolved in 100 ml. of absolute ethanol was stirred at reflux for 1 hour. Upon cooling the product crystallized and the mixture was filtered. The filter cake was washed with water and dried over phosphorous pentoxide to yield 15.1 grams of white crystalline solid product which was homogeneous by thin layer chromatography. The product, which evidenced a melting point of 151–152° C., was obtained in 90.5 percent yield.

Analysis.—Calc'd for $C_{19}H_{26}O_4N_4$ (percent): C, 60.94; H, 7.00; N, 14.96. Found (percent): C, 60.95; H, 6.98; N, 14.74.

Example VII.—Preparation of 4-piperazinyl-6,7-dimethoxyquinazoline

The procedure of Parts A and B of Example V were used to prepare 4-chloro-6,7-dimethoxyquinazoline.

A solution of 20.5 grams (0.09 mole) of 4-chloro-6,7-dimethoxyquinazoline dissolved in 1 liter of chloroform was added, dropwise, over a 24 hour period, to a stirred, refluxing solution of 77.4 grams (0.9 mole) of anhydrous piperazine dissolved in 1 liter of absolute ethanol. The resultant solution was evaporated to a crystalline residue which was dissolved in 600 ml. of water. The aqueous solution was extracted with four 200 ml. portions of methylene chloride and the combined extracts were dried over sodium sulfate. Evaporation of the solvent afforded 23.7 grams of a crystalline residue which melted at 143–147° C. The residue was recrystallized from 150 ml. of ethyl acetate to separate 18.2 grams of white rods, with a melting point of 147–148° C., which were homogeneous by thin layer chromatography. Further recrystallization from ethyl acetate provided an analytical sample, as white rods, which melted at 150–151.5° C. The procedure afforded a yield of 74 percent.

Analysis.—Calc'd for $C_{14}H_{18}N_4O_2$ (percent): C, 61.29; H, 6.61; N, 20.43. Found (percent): C, 61.24; H, 6.40; N, 20.26.

Example VIII.—Preparation of 4-(4-isovaleryl-1-piperazinyl)-6,7-dimethoxyquinazoline The procedure of Example VII was used to prepare 4-piperazinyl-6,7-dimethoxyquinazoline.

A solution of 0.635 gram (0.0051 mole) of isovaleryl chloride dissolved in 5 ml. of methylene chloride was added to a solution of 1.37 grams (0.005 mole) of 4-piperazinyl-6,7-dimethoxyquinazoline and 0.51 gram (0.0051 mole) of triethylamine dissolved in 20 ml. of methylene chloride over a period of 15 minutes. During the addition the solution was cooled in an ice bath. The mixture was stirred at room temperature for 20 minutes and 60 ml. of methylene chloride was added. The solution was then extracted with three 60 ml. portions of water. The organic phase was dried over sodium sulfate and evaporated to 1.6 grams of gummy residue. The residue was recrystallized from 1:9 benzenehexane to deposit 1.15 grams of crystalline solid which evidenced a melting point of 125–126° C. and which was homogeneous by thin layer chromatography. The procedure afforded a yield of 64 percent.

Analysis.—Calc'd for $C_{19}H_{26}O_3N_4$ (percent): C, 63.66; H, 7.31; N, 15.63. Found (percent): C, 63.55; H, 7.29; N, 15.43.

Example IX.—Preparation of 4-(2-methyl-6,7-dimethoxyquinazolin - 4 - yl) - piperazine - 1 - carboxylic acid, isobutyl ester A 5.0 gram sample (0.0225 mole) of 2-methyl-6,7-dimethoxy - 4 - (3H) - quinazolinone was chlorinated with phosphorous oxychloride according to the procedure given in Example IV. The resultant crude solid was heated at 130° C. for 4 hours together with 12.6 grams (0.0675 mole) of piperazine-1-carboxylic acid, isobutyl ester and 40 ml. of ethanol. The resultant mixture was cooled and filtered. The filter cake, which had a total weight of 3.0 grams, was dissolved in water and the solution was made basic with ammonium hydroxide solution. The resultant precipitate was triturated with chloroform after which the chloroform washes were evaporated. The residue, after evaporation, was recrystallized from methanol-water. This procedure yielded 1.3 grams of white solid which evidenced a melting point of 131–132° C. and was homogeneous by thin layer chromatography.

The filtrate which was obtained from the original reaction mixture was evaporated to dryness and the resultant gummy residue was treated according to the above procedure. A yield of 1.2 grams of white solid, which evidenced a melting point of 131–132° C., was obtained. This material was identical with the material produced from the filter cake. The total yield of product by this procedure was 29 percent and 2.5 grams of product was obtained.

The procedure of Example II was carried out using the free base. The hydrochloride was obtained as a white solid which evidenced a melting point of 228° C. This temperature was also the decomposition point.

Analysis.—Cal'd for $C_{20}H_{28}N_4O_4 \cdot HCl \cdot \frac{1}{2}H_2O$ (percent): C, 54.23; H, 7.05; N, 12.65; Cl, 8.00. Found (percent): C, 54.27; H, 7.25; N, 12.58; Cl, 8.02.

Example X.—Preparation of 4-amino-6,7-ethylenedioxyquinazoline

The procedure of Example V was carried out except that 4,5-ethylenedioxy-o-aminobenzoic acid amide was used in the procedure described in Part A of Example V. The resultant product, which was recrystallized from a mixture of ethanol and ether, evidenced a melting point of 234–236° C. The hydrochloride, which was prepared by the procedure of Example II, evidenced a melting point of 278–281° C.

Example XI.—Preparation of 2-amino-6,7-diisopropoxyquinazoline

The procedure of Example V was carried out except that the starting material was 4,5-di-isopropoxy-o-aminobenzoic acid amide. The resultant material, which was crystallized from benzene, evidenced a melting point of 147.5–148.5° C. The hydrochloride, which was prepared by the method outlined in Example II, evidenced a melting point of 250–251° C.

Example XII.—Preparation of 4-amino-7-methoxyquinazoline

The procedure of Example V was carried out except that 4-methoxy-o-aminobenzoic acid amide was used as a starting material. The resultant product, which was crystallized from methanol, evidenced a melting point of 270–271° C. and the corresponding hydrochloride evidenced a melting point of 255–256° C.

Example XIII.—Preparation of substituted 6,7-dimethoxyquinazolines

The procedure described in Example V was followed in preparing the compounds listed below except that the appropriate amine base was substituted as a reagent in place of diethylamine on the same molar basis as before. The corresponding hydrochlorides were prepared by the method of Example II.

4-amino-6,7-dimethoxyquinazoline, M.P. 205–207° C.; recrystallized from water; 2-amino-6,7-dimethoxyquinazoline hydrochloride, M.P. 275° C.

4 - methylamino-6,7-dimethoxyquinazoline, M.P. 206–208° C.; recrystallized from ethanol; 4-methylamino-6,7-dimethoxyquinazoline hydrochloride, M.P. 264–265° C.

4-ethylamino-6,7-dimethoxyquinazoline, M.P. 223–224° C.; recrystallized from methanol; 4-ethlyamino-6,7-dimethoxyquinazoline hydrochloride, M.P. 261–262° C.

4 - propylamino-6,7-dimethoxyquinazoline, M.P. 207–208° C.; recrystallized from ethyl acetate; 4-propylamino-6,7-dimethoxyquinazoline hydrochloride, M.P. 246–248' C.

4-isopropylamino-6,7-dimethoxyquinazoline, M.P. 248–250° C.; recrystallized from ethanol; 4-isopropylamino-6,7-dimethoxyquinazoline hydrochloride, M.P. 250° C. (decomposition).

4 - cyclopropylamino - 6,7-dimethoxyquinazoline, M.P. 237–239° C.; recrystallized from ethyl acetate; 4-cyclopropylamino - 6,7 - dimethoxyquinazoline hydrochloride, M.P. 253.5–254° C. (decomposition).

4 - phenylamino-6,7-dimethoxyquinazoline, M.P. 236–238° C.; 4-phenylamino-6,7-dimethoxyquinazoline hydrochloride, M.P. 259–260° C.

4 - benzylamino-6,7-dimethoxyquinazoline, M.P. 230–231° C.; recrystallized from ethanol; 4-benzylamino-6,7-dimethoxyquinazoline hydrochloride, M.P. 250°C.

4 - (2 - phenylethylamino) - 6,7-dimethoxyquinazoline, M.P. 190–191° C.; recrystallized from water; 4-(2-phenylethylamino) - 6,7 - dimethoxyquinazoline hydrochloride, 239–241° C.

4-diethylamino-6,7-dimethoxyquinazoline, M.P. 112–114° C.; 4 - diethylamino - 6,7 - dimethoxyquinazoline hydrochloride, M.P. 224° C.

4-dipropylamino-6,7-dimethoxyquinazoline, M.P. 147–148° C.; recrystallized from methanol-water; 4-dipropylamino - 6,7 - dimethoxyquinazoline hydrochloride; M.P. 207° C. (decomposition).

4-(4-morpholino)-6,7-dimethoxyquinazoline, M.P. 139–140° C.; recrystallized from chloroform-isopropyl ether; 4 - (4-morpholino)-6,7-dimethoxyquinazoline hydrochloride, M.P. 225–256° C.

4 - (4 - [β-hydroxyethyl]-1-piperidino)-6,7-dimethoxyquinazoline, M.P. 147–150° C.; 4-(4-[β-hydroxyethyl]-1-piperidino)-6,7-dimethoxyquinazoline hydrochloride, M.P. 199–201° C. (decomposition).

4 - (4-hydroxypiperidino-1-)6,7-dimethoxyquinazoline; recrystallized from isopropyl alcohol, M.P. 201–201.5° C.; 4 - (4 - hydroxypiperidino - 1-)6,7-dimethoxyquinazoline hydrochloride, M.P. 233° C. (decomposition).

4 - (4 - phenylpiperidino-1-)6,7-dimethoxyquinazoline, M.P. 159–160° C.; recrystallized from methanol; 4-(4-phenylpiperidino-1-)6,7-dimethoxyquinazoline hydrochloride, M.P. 214–215° C. (decomposition).

4 - (4-carboxypiperidino-1-)6,7-dimethoxyquinazoline, M.P. 254–256° C.

Example XIV.—Preparation of substituted 6,7-dimethoxyquinazolines

The following compounds were prepared by the procedures given in Example VI, Example VIII, or Example IX. The appropriate ester or chloride was used in place of the piperazine-1-carboxylic acid, isobutyl ester or the isovaleryl chloride on the same molar basis as before. The corresponding hydrochloride was produced by the method of Example II.

4-(piperazino-1-)-6,7-dimethoxyquinazoline, M.P. 150–151.5° C.; recrystallized from ethyl acetate; 4-(piperazino-1 - )6,7-dimethoxyquinazoline hydrochloride, M.P. 229–230° C. (decomposition).

4-(4 - methylpiperazino - 1-)-6,7-dimethoxyquinazoline, M.P. 159–160° C.; recrystallized from methylene chloride-isopropyl ether; 4-(4-methylpiperazino-1-)-6,7-dimethoxyquinazoline hydrochloride, M.P. 300–301° C. (decomposition).

4 - (4 - allyl-piperazino-1-)-6,7-dimethoxyquinazoline, M.P. 128–130° C.; recrystallized from isopropyl ether; 4-(4-allyl-piperazino-1-)-6,7-dimethoxyquinazoline hydrochloride, M.P. 239–242° C. (decomposition).

4 - (4 - β - hydroxyethylpiperazino-1-)-6,7-dimethoxyquinazoline, M.P. 155–158° C.; recrystallized from ethyl acetate; 4-(4-β-hydroxyethylpiperazino-1-)-6,7-dimethoxyquinazoline hydrochloride, M.P. 230–232.5° C. (decomposition).

4 - (4-phenylpiperazino - 1-)-6,7-dimethoxyquinazoline, M.P. 152.5–156° C.; recrystallized from methanol-water; 4 - (4-phenylpiperazino-1-)-6,7-dimethoxyquinazoline hydrochloride, M.P. 221–223° C. (decomposition).

4 - (4-[6,7 - dimethoxy-4-quinazolinyl]-piperazino-1-)-6,7-dimethoxyquinazoline, M.P. 264–265° C.; recrystallized from chloroform-methanol; 4-(4-[6,7-dimethoxy-4-quinazolyl]-piperazino-1-)-6,7-dimethoxyquinazoline hydrochloride, M.P. 253–255° C. (decomposition).

4 - (6,7 - dimethoxyquinazolin - 4-yl)-piperazino-1-carboxylic acid, ethyl ester, M.P. 145–147° C.; recrystallized from benzene-hexane; 4-(6,7-dimethoxyquinazolin-4-yl)-piperazine-1-carboxylic acid, ethyl ester hydrochloride, M.P. 215–216° C.

4 - (6,7 - dimethoxyquinazolin - 4-yl)-piperazino-1-carboxylic acid, propyl ester, M.P. 131–133° C.; recrystallized from methanol-water; 4-(6,7-dimethoxyquinazolin-4-yl-)-piperazine-1-carboxylic acid, propyl ester hydrochloride, M.P. 229° C. (decomposition).

4 - (6,7 - dimethoxyquinazolin - 4-yl)-piperazine-1-carboxylic acid, isopropyl ester.

4 - (6,7 - dimethoxyquinazolin - 4-yl)-piperazine-1-carboxylic acid, butyl ester, M.P. 129–130° C., recrystallized from methanol-water; 4-(6,7-dimethoxyquinazolin-4-yl)-piperazine-1-carboxylic acid, butyl ester hydrochloride, M.P. 199–200° C.

4-(6,7 - dimethoxyquinazolin - 4 - yl)-piperazine-1-carboxylic acid, isobutyl ester, M.P. 151–152° C.; recrystallized from methanol; 4-(6,7-dimethoxyquinazolin-4-yl)-piperazine-1-carboxylic acid, isobutyl ester hydrochloride, M.P. 217° C. (decomposition).

4-(6,7 - dimethoxyquinazolin - 4 - yl)-piperazine-1-carboxylic acid, pentyl ester, M.P. 153–154° C.; recrystallized from methanol; 4-6,7-dimethoxyquinazolin-4-yl)-piperazine-1-carboxylic acid, pentyl ester hydrochloride, M.P. 212–212.5° C. (decomposition).

4-(6,7 - dimethoxyquinazolin - 4 - yl)-piperazine-1-carboxylic acid, hexyl ester, M.P. 143.5–145° C.; recrystallized from methanol-water; 4-(6,7-dimethoxyquinazolin-4-yl)-piperazine-1-carboxylic acid, hexyl ester hydrochloride, M.P. 187–187.5° C. (decomposition).

4-(6,7 - dimethoxyquinazolin - 4 - yl)-piperazine-1-carboxylic acid, tetrahydrofurfuryl ester, M.P. 139–140° C.; recrystallized from benzene-hexane.

4-(6,7 - dimethoxyquinazolin - 4 - yl)-piperazine-1-carboxylic acid, phenyl ester, M.P. 154–155° C.; recrystallized from acetone-water; 4-(6,7-dimethoxyquinazolin-4-yl)-piperazine-1-carboxylic acid, phenyl ester hydrochloride, M.P. 231° C.

4-(6,7 - dimethoxyquinazolin - 4 - yl)-piperazine-1-carboxylic acid, benzyl ester, M.P. 132–133.5° C.; recrystallized from methanol-water; 4-(6,7-dimethoxyquinazolin-4-yl)-piperazine-1-carboxylic acid, benzyl ester hydrochloride, M.P. 198–199° C.

4-(4 - acetylpiperazino - 1)-6,7-dimethoxyquinazoline, M.P. 186° C.; recrystallized from isopropanol-isopropyl ether; 4-(4-acetylpiperazino-1)-6,7-dimethoxyquinazoline, hydrochloride M.P. 224–225° C. (decomposition).

4-(4-propionylpiperazino-1) - 6,7 - dimethoxyquinazoline, M.P. 150–151°C.; recrystallized from benzene-hexane; 4-(4-propionylpiperazino-1) - 6,7-dimethoxyquinazoline hydrochloride, M.P. 216–217° C.

4-(4-propionylpiperazino-1) - 6,7 - dimethoxyquinazoline, M.P. 134–135° C.; recrystallized from benzene-hexane; 4-(4-butyrylpiperazino-1)-6,7-dimethoxyquinazoline hydrochloride, M.P. 179–181° C. (decomposition).

4-(4 - isobutyrylpiperazino-1) - 6,7 - dimethoxyquinazoline, M.P. 172–173° C.; recrystallized from benzene-hexane; 4-(4 - isobutyrylpiperazino-1) - 6,7-dimethoxyquinazoline hydrochloride, M.P. 210–211° C.

4-(4-valerylpiperazino-1) - 6,7 - dimethoxyquinazoline, M.P. 130.5–132° C.; recrystallized from ethyl acetate-hexane; 4-(4 - valerylpiperazino-1)-6,7-dimethoxyquinazoline hydrochloride, M.P. 209–210° C.

4-(4-heptanoylpiperazino-1) - 6,7 - dimethoxyquinazoline, M.P. 136–138° C.; recrystallized from methanol-water; 4-(4 - heptanoylpiperazino-1)-6,7-dimethoxyquinazoline hydrochloride, M.P. 157–158° C. (decomposition).

4-(4 - benzoyl - 1 - piperazinyl)-6,7-dimethoxyquinazoline, M.P. 221–223° C.; recrystallized from methanol; 4-(4 - benzoyl - 1 - piperazinyl)-6,7-dimethoxyquinazoline hydrochloride, M.P. 183–185° C.

4-(4 - acrylylpiperazino-1) - 6,7 - dimethoxyquinazoline, M.P. 127–129° C.; recrystallized from benzene-hexane; 4-(4 - acrylylpiperazino-1) - 6,7 - dimethoxyquinazoline hydrochloride, M.P. 102–104° C.

4-(4-(2-furoyl) - piperazino-1) - 6,7-dimethoxyquinazoline, M.P. 159–161° C.; recrystallized from benzene-hexane; 4-(4 - (2 - furoyl)-piperazino-1)-6,7-dimethoxy-quinazoline hydrochloride, M.P. 222–223° C.

4-(4 - dimethylformamidopiperazino-1)-6,7-dimethoxyquinazoline, M.P. 147–148.5° C.; recrystallized from benzene-isopropyl ether; 4-(4-dimethylformamidopiperazino-1)-6,7-dimethoxyquinazoline hydrochloride; M.P. 167–168° C.

4-(trifluoroacetylpiperazino-1) - 6,7 - dimethoxyquinazoline, M.P. 191–192° C.; recrystallized from methylene chloride-isopropyl ether; 4-(4-trifluoroacetylpiperazino-1)-6,7-dimethoxyquinazoline hydrochloride, M.P. 225–226° C.

4-(4 - trichloroacetylpiperazino-1) - 6,7 - dimethoxyquinazoline, M.P. 84–88° C.; recrystallized from dimethylformamide-water; 4 - (4-trichloroacetylpiperazino-1)-6,7-dimethoxyquinazoline hydrochloride, M.P. 243–244° C.

4-(4 - methylsulfonylpiperazino-1) - 6,7 - dimethoxyquinazoline, M.P. 239–240° C.; recrystallized from chloroform-methanol; 4-(4-methylsulfonylpiperazino-1) - 6,7-dimethoxyquinazoline hydrochloride, M.P. 246° C. (decomposition).

4-(4 - phenylsulfonylpiperazino-1) - 6,7 - dimethoxyquinazoline, M.P. 186–187° C.; recrystallized from benzene; 4-(4 - phenylsulfonylpiperazino-1)-6,7-dimethoxyquinazoline hydrochloride; M.P. 236–237° C. (decomposition).

4-(homopiperazino-1) - 6,7 - dimethoxyquinazoline, M.P. 146.5–148° C.; recrystallized from ethyl acetate.

4-(6,7 - dimethoxyquinazolin-4-yl)-homopiperazino-1-carboxylic acid, isobutyl ester, M.P. 109–112° C.; recrystallized from isopropyl ether-hexane; 4-(6,7-dimethoxyquinazoline-4-yl)-homopiperazino - 1 - carboxylic acid, isobutyl ester hydrochloride, M.P. 214–215° C. (decomposition).

Example XV.—Preparation of substituted 4-(6,7-dimethoxyquinazolin-4-yl)-piperazine-1-carboxylic acid, isobutyl esters The procedure described in Example I was followed in preparing the compounds listed below except that the appropriate acid chloride was substituted as a reagent in place of the propionyl chloride on the same molar basis as before.

The corresponding hydrochlorides were prepared by the method of Example II.

4-(2 - trifluormethyl - 6,7 - dimethoxyquinazolin-4-yl)-piperazine-1-carboxylic acid, isobutyl ester, M.P. 132–133° C.; recrystallized from ethanol; 4-(2-trifluoromethyl-6,7-dimethoxyquinazolin - 4 - yl)-piperazine-1-carboxylic acid, isobutyl ester hydrochloride, M.P. 169–171° C.

4-(2 - propyl - 6,7 - dimethoxyquinazolin-4-yl)-piperazine-1-carboxylic acid, isobutyl ester, M.P. 100–102° C.; recrystallized from hexane: 4-(2-propyl-6,7-dimethoxyquinazolin-4-yl)-piperazine-1-carboxylic acid, isobutyl ester hydrochloride, M.P. 202–204° C.

4-(2 - isopropyl - 6,7 - dimethoxyquinazoline-4-yl)-piperazine-1-carboxylic acid, isobutyl ester, M.P. 102–104° C.; recrystallized from hexane; 4-(2-isopropyl-6,7-dimethoxyquinazolin-4-yl) - piperazine-1-carboxylic acid, isobutyl ester hydrochloride, M.P. 198–199.5° C. (decomposition).

4-(2 - t - butyl-6,7-dimethoxyquinazolin-4-yl)-piperazine-1-carboxylic acid, isobutyl ester, M.P. 89–91° C.; recrystallized from hexane; 4-(2-t-butyl-6,7-dimethoxyquinazolin-4-yl)-piperazine-1-carboxylic acid, isobutyl ester hydrochloride, M.P. 180–181.5° C.

4-(2 - phenyl - 6,7 - dimethoxyquinazolin-4-yl)-piperazine-1-carboxylic acid, isobutyl ester, M.P. 164–166° C.; recrystallized from methanol; 4-(2-phenyl-6,7-dimethoxyquinazolin-4-yl) - piperazine-1-carboxylic acid, isobutyl ester hydrochloride, M.P. 227–228° C. (decomposition).

4-(2-benzyl-6,7-dimethoxyquinazolin-4-yl)-piperazine-1-carboxylic acid, isobutyl ester, M.P. 62–64° C.; recrystallized from dichloromethane hexane; 4-(2-benzyl-6,7-dimethoxyquinazolin-4-yl) - piperazine-1-carboxylic acid, isobutyl ester hydrochloric, M.P. 198–199° C.

4-(2-phenylethyl-6,7-dimethoxyquinazolin-4-yl)-piperazine-1-carboxylic acid, isobutyl ester, M.P. 100–101° C.; recrystallized from benzene-hexane; 4-(2-phenylethyl-6,7-dimethoxyquinazolin-4-yl) - piperazine-1-carboxylic acid, isobutyl ester hydrochloride, M.P. 190–191° C.

4 - (6,7-dimethoxyquinazolin-4-yl)-piperazine-1-carboxylic acid, isobutyl ester hydrochloride, M.P. 217° C. (decomposition).

Example XVI.—Preparation of 4-amino-6,7-dimethoxyquinazoline

The procedures of Example V were used to prepare 4-amino-6,7-dimethoxyquinazoline except that ammonia was used as a reagent in place of the dimethylamine, on the same molar basis. The resultant compound, which was recrystallized from water, evidenced a melting point of 205–207° C. The corresponding hydrochloride, which was prepared by the method of Example II, evidenced a melting point of 275° C.

Example XVII.—Preparation of 2-substituted-4-amino-6,7-dimethoxyquinazolines

The following compounds were prepared by the methods of Example III except that appropriate acid chlorides were used as reagents in place of the propionyl chloride which was used in the procedures of Example III.

The corresponding hydrochlorides were prepared by the method of Example II.

2-trifluormethyl-4-amino - 6,7 - dimethoxyquinazoline, M.P. 284–286° C.; recrystallized from methanol; 2-trifluormethyl-4-amino-6,7-dimethoxyquinazoline hydrochloride, M.P. 258–259° C. (decomposition).

2 - ethyl-4-amino-6,7-dimethoxyquinazoline hydrochloride, M.P. 262–263° C. (decomposition).

2-propyl-4-amino-6,7-dimethoxyquinazoline, M.P. 224–226° C.; recrystallized from methanol; 2-propyl-4-amino-6,7-dimethoxyquinazoline hydrochloride, M.P. 258–260° C. (decomposition).

2-isopropyl - 4 - amino-6,7-dimethoxyquinazoline, M.P. 217–218° C.; 2-isopropyl-4-amino-6,7-dimethoxyquinazoline hydrochloride, M.P. 255-257° C.

2-t-butyl-4-amino-6,7-dimethoxyquinazoline hydrochloride, M.P. 272–273° C. (decomposition).

2-phenyl-4-amino-6,7-dimethoxyquinazoline, M.P. 203–204° C.; recrystallized from methanol; 2-phenyl-4-amino-6,7-dimethoxyquinazoline hydrochloride, M.P. 258–260° C. (decomposition).

2-benzyl-4-amino-6,7-dimethoxyquinazoline.

2-phenylethyl-4-amino-6,7-dimethoxyquinazoline hydrochloride, M.P. 270–271° C. (decomposition).

Example XVIII.—Preparation of 2-diethylamino-4-methyl-6,7-dimethoxyquinazoline

Part A: Preparation of diethyl 4-(2-chloro-6,7-dimethoxyquinazoline)-malonate.—A solution of diethyl sodiomalonate in dimethylformamide was prepared from 11.5 grams (0.24 mole) of a 50% sodium hydride-mineral oil dispersion from which the mineral oil had been removed by washing with hexane, 32.0 grams (0.2 mole) of diethylmalonate and 100 ml. of dimethylformamide. To this solution, 51.8 grams (0.2 mole) of 2,4-dichloro-6,7-dimethoxyquinazoline was added. The 2,4-dichloro-6,7-dimethoxyquinazoline was prepared according to the procedure of F. H. S. Curd et al., J. Chem. Soc. (London), 1759 (1948). The resultant solution was heated at 60° C. for 40 hours and was poured into 4 liters of ice water, after cooling. The resultant mixture was filtered and washed well with water in order to separate 61.0 grams of diethyl 4-(2-chloro - 6,7 - dimethoxyquinazolyl)-malonate. This compound evidenced a melting point of 137–142° C. and was produced at a 80 percent yield. Recrystallization of 1.0 gram from 50 ml. of ethanol yielded 600 mg. (60 percent recovery) of material which evidenced a melting point of 160.5–162.5° C. The compound was shown to be homogeneous by thin layer chromatography using benzene-ethyl acetate-5% diethylamine as a solvent system.

Part B: Preparation of 2-chloro-4-methyl-6,7-dimethoxyquinazoline.—A suspension of 30.0 grams (0.0785 mole) of diethyl-4-(2 - chloro-6,7-dimethoxyquinazolyl)-malonate in 300 ml. of 1.0 N sodium hydroxide solution was prepared and was refluxed with vigorous stirring for one hour. A complete solution occurred after 25 minutes and a precipitate was formed after 40 minutes of refluxing and stirring. The cooled reaction mixture was filtered in order to separate 8.7 grams of 2-chloro-4-methyl-6,7-dimethoxyquinazoline. The product, which was produced at a yield of 46.5 percent, evidenced a melting point of 179–181° C. Recrystallization of a portion of the product from methanol provided an analytical sample which melted at 183–185° C. and which was homogeneous by thin layer chromatography.

Analysis.—Calc'd. for $C_{11}H_{11}N_2O_2Cl$ (percent): C, 55.35; H, 4.64; N, 11.74; Cl, 14.85. Found (percent): C, 55.59; H, 4.67; N, 11.69; Cl, 14.80.

Part C: Preparation of 2-diethylamino-4-methyl-6,7-dimethoxyquinazoline.—A stainless steel pressure vessel was charged with 4.0 grams (0.0168 mole) of 2-chloro-4-methyl-6,7-dimethoxyquinazoline, 40 ml. of diethylamine and 40 ml. of ethanol. The pressure vessel was immersed in a heating bath which was maintained at 130° C. for 3 hours. The resultant solution was filtered in order to remove 800 milligrams of unidentified solid material and the filtrate was evaporated to dryness. The resultant solid was dissolved in 100 ml. of boiling hexane and 1.2 grams of insoluble material was removed by filtration. The insoluble material evidenced a melting point of 81–106° C. The filtrate was concentrated to 25 ml. and chilled and filtered to separate 2.35 grams of pale yellow crystalline solid product. The product, which melted at 95–97° C., was obtained in a yield of 51 percent and was homogeneous by thin layer chromatography.

Analysis.—Calc'd. for $C_{15}H_{21}N_3O_2$ (percent): C, 65.43; H, 7.69; N, 15.26. Found (percent): C, 65.69; H, 7.83; N, 15.05.

Part D: Preparation of the hydrochloride salt of 2-diethylamino-4-methyl-6,7-dimethoxyquinazoline.—The hydrochloride salt was prepared by dissolving 2.35 grams of the free base in 30 ml. of ethanol and passing hydrogen chloride gas through the solution for 10 minutes. After filtration the resultant solid was washed with ether and dried. A pale yellow solid which consisted of 2.15 grams of 2-diethylamino-4-methyl-6,7-dimethoxyquinazoline hydrochloride was obtained. The melting point of the solid, which was obtained at the yield of 82.5 percent, was 220–221° C.

Analysis.—Calc'd. for $C_{15}H_{21}N_3O_2 \cdot HCl$ (percent); C, 57.78; H, 7.11; N, 13.47; Cl, 11.37. Found (percent): C, 57.79; H, 7.12; N, 13.19; Cl, 11.26.

Example XIX.—Preparation of 2-amino-4-methyl-6,7-dimethoxyquinazoline

A mixture of 19.0 grams (0.0821 mole) of 2-amino-4,5 - dimethoxyacetophenone hydrochloride and 19.0 grams (0.45 mole) of cyanamide was heated to 50° C. for 45 minutes. The dimethoxyacetophenone was obtained by the method of D. Bar and Erb-Debryne, Ann. Pharm., France, 16, 235 (1958). A complete solution resulted after 20 minutes and the reaction mixture solidified after 30 minutes. The solid material was dissolved in 600 ml. of water and the solution was made basic using concentrated ammoniu mhydroxide solution. The basic mixture was chilled to 0° C. Upon cooling, the resultant solid material was collected by filtration, washed with water and dried to produce 19.2 grams of crude material with a melting point of 212–216° C. Recrystallization from 700 ml. of hot water produced 15.0 grams of beige amorphous solid, 2-amino-4-methyl-6,7-dimethoxyquinazoline. The material, which was produced in 83.5 percent yield, evidenced a melting point of 218–220° C. and presented a single spot by thin layer chromatography.

Analysis.—Calc'd. for $C_{11}H_{13}N_3O_2$ (percent): C, 60.26; H, 5.98; N, 19.15. Found (percent): C, 59.66; H, 5.72; N, 18.84.

Example XX.—Preparation of 2-amino-4-methyl-6,7-dimethoxyquinazoline hydrochloride The hydrochloride salt was prepared by dissolving 3.0 grams (0.0137 mole) of 2-amino - 4 - methyl-6,7-dimethoxyquinazoline in 230 ml. of hot ethanol and passing hydrogen chloride gas through the solution for 10 minutes. Upon cooling and filtration, 3.1 grams of amorphous 2-amino - 4 - methyl - 6,7 - dimethoxyquinazoline hydrochloride was obtained. The product, which melted at 282–283° C. (decomposition), was obtained in 89.4 percent yield. A single spot, identical with the spot obtained with the free base, was obtained by thin layer chromatography.

Analysis.—Calc'd. for $C_{11}H_{13}N_3O_2 \cdot HCl$ (percent): C, 51.67; H, 5.52; N, 16.43; Cl, 13.86. Found (percent): C, 51.44; H, 5.47; N, 16.39; Cl, 13.60.

Example XXI.—Preparation of 2-alkylamino-4-alkyl-6,7-dialkoxyquinazolines

The following compounds were prepared by the methods of Example XVIII except that appropriate amines were used as reagents in place of the diethylamine used in the procedures of Example XVIII. Substantially identical molar ratios were employed.

2-dimethylamino - 4 - methyl - 6,7 - dimethoxyquinazoline, M.P. 131–133° C.; 2-dimethylamino - 4 - methyl-6,7-dimethoxyquinazoline hydrochloride, M.P. 258° C.

of Example II, III, IV and V. These compounds are listed in Table II and Table III.

TABLE II

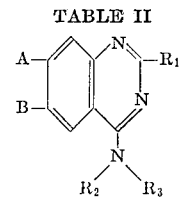

| A | B | R₁ | R₂ | R₃ |
|---|---|---|---|---|
| CH₃O— | C₃H₇O— | C₄H₉— | H— | C₆H₅(CH₂)₂— |
| CH₃O— | CH₃O— | C₂H₇— | C₆H₅(CH₂)— | C₆H₅— |
| C₂H₅O— | CH₃O— | CH₃— | CH₂=CH—CH₂— | H— |
| OH | OH | CH₃ | H | CH₃ |
| CH₃ | OH | CH₃ | CH₃ | H |
| H | CH₃O— | C₃H₇ | CH₃ | CH₃ |
| C₂H₅O— | H | C₄H₉ | C₂H₅ | H |
| CH₃ | CH₃ | CH₃ | H | CH₃ |
| Benzo | | CH₃ | CH₃ | C₂H₅ |
| —O—CH₂—O— | | C₄H₉ | CH₃ | H |
| —O—(CH₂)₂—O— | | C₃H₇ | H | CH₃ |
| CH₃ | CH₃ | CH₃ | H | CH₃ —O—(CH)HH |
| Benzo | | CH₃ | CH₃ | C₂H₅ |
| —O—CH₂—O— | | C₄H₉ | CH₃ | H |
| —O—(CH₂)₂—O— | | C₃H₇ | H | CH₃ |
| —O—(CH₂)₄—O— | | CH₃ | CH₃ | CH₃ |
| C₂H₅O— | CH₃O— | C₄H₉— | CH₃(CH₂)₅— | CH₃—(CH₂)₄— |
| CH₃O— | C₃H₇O— | C₂H₅— | CH₃(CH₂)₂CH=CH— | CH₂=CH(CH₂)₄— |
| CH₃O— | CH₃O— | C₂H₅— | C₃H₇— | CH₂=CH—CH₂—CH₂— |
| CH₃O— | CH₃O— | CH₃— | CH₂=CH—CH₂— | CH₃—CH—CH=CH—CH₂—<br>CH₃ |
| CH₃O— | CH₃O— | C₃H₇— | HOCH₂—CH₂— | HOCH₂CH₂—CH₂CH₂— |
| CH₃O— | CH₃O— | H— | C₂H₅— | HOCH₂CH₂CH₂—CH₂— |
| CH₃O— | C₂H₅O— | CH₃— | HOCH₂CH₂CH₂—CH₂— | HO(CH₂)₄— |
| CH₃O— | C₃H₇O— | C₅H₁₁— | H— | Cyclohexyl— |

2 - methyl - 4 - (4-allyl-piperazino-1-)-6,7-dimethoxyquinazoline, M.P. 138–140° C.; 2 - methyl - 4 - (4-allyl-piperazino-1-) - 6,7 - dimethoxyquinazoline hydrochloride, M.P. 238–240° C.

4 - (4 - methyl - 6,7 - dimethoxyquinazolin - 2 - yl)-piperazine - 1 - carboxylic acid, ethyl ester, M.P. 153–155° C.; 4 - (4 - methyl - 6,7 - dimethoxyquinazolin-2-yl)-piperazine - 1 - carboxylic acid, ethyl ester hydrochloride, M.P. 247° C.

4 - (4 - methyl - 6,7 - dimethoxyquinazolin - 2 - yl)-piperazine - 1 - carboxylic acid, phenyl ester, M.P. 201–203° C.; 4 - (4 - methyl - 6,7 - dimethoxyquinazolin-2-yl)-piperazine - 1 - carboxylic acid, phenyl ester hydrochloride, M.P. 237.5–240° C. (decomposition).

Example XXII.—4-diethylamino-6,7-dipentoxyquinazoline 4-diethylamino - 6,7 - dipentoxyquinazoline is prepared by the methods of Example V except that 4,5 - dipentoxy-o-aminobenzoic acid amide is used as the initial reagent.

Example XXIII.—2-hexyl-4-amino-6,7-dimethoxyquinazoline

2 - hexyl - 4 - amino - 6,7 - dimethoxyquinazoline is prepared by the methods of Example III except that the appropriate acid chloride is used instead of the propionyl chloride which was used in Example III.

Example XXIV.—4-diethylamino-6-propoxyquinazoline

4 - diethylamino - 6 - propoxyquinazoline is prepared by the methods of Example V except that 5-propoxy-o-aminobenzoic acid amide is used as the initial reagent.

Example XXV.—2-alkyl-4-alkylamino-6,7-dialkoxyquinazolines

The 2 - alkyl - 4 - alkylamino - 6,7 - dialkoxyquinazolines, related compounds and their pharmaceutically acceptable acid addition salts are prepared by the methods

TABLE III

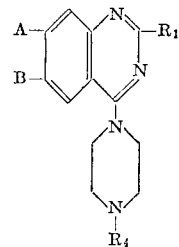

| A | B | R₁ | R₄ |
|---|---|---|---|
| C₂H₅O— | CH₃O— | CH₃— | CH₃—CH—(CH₂)₂—<br>CH₂—CH₃ |
| CH₃O— | CH₃O— | C₂H₅— | CH₃—CH—(CH₂)₃—<br>CH₃ |
| CH₃O— | CH₃O— | CH₃— | CH₂=CH—CH₂— |
| CH₃O— | C₂H₅O— | H— | H— |
| CH₃O— | CH₃O— | C₄H₉— | 4-i-butylphenyl— |
| C₂H₅O— | C₂H₅O— | H— | β-naphthyl— |
| CH₃O— | CH₃O— | CH₃— | 3,5-diethylphenyl |
| CH₃O— | CH₃O— | C₂H₅— | CH₂=C—CH₂—<br>CH₃ |
| C₂H₅O— | CH₃O— | CH₃— | CH₃—CH=CHCH₂— |
| CH₃O— | C₂H₅O— | CH₃— | CH₃(CH₂)₅CO— |
| CH₃O— | CH₃O— | C₂H₅— | CH₂=CH—CH₂—O—CO |
| CH₃O— | C₂H₅O— | CH₃— | CH=C—CH₂—O—CO—<br>CH₃ |
| CH₃O— | CH₃O— | CH₃— | CH₃—CH=CH—CH₂—O—CO |
| C₂H₅O— | CH₃O— | C₃H₇— | CH₃—CH—CO—<br>C₂H₅ |
| CH₃O— | C₂H₅O— | C₂H₅— | C₆H₅— |
| CH₃O— | CH₃O— | CH₃— | α-naphthyl— |

Example XXVI.—2-alkyl-4-(homopiperazino-1-)-6,7-dialkoxyquinazolines

The 2 - alkyl - 4 - (homopiperazino-1-) - 6,7 - dialkoxyquinazolines, related compounds and their pharmaceutically-acceptable addition salts are prepared by the methods of Examples II, III, IV and V. The compounds are listed in Table III with reference to the following formula:

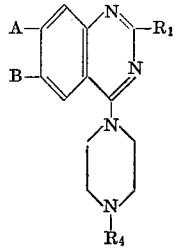

Example XXVII.—2-alkylamino-4-alkyl-6,7-dialkoxyquinazolines

The 2-alkylamino-4-alkyl - 6,7 - dialkoxyquinazolines, related compounds and their pharmaceutically-acceptable addition salts are prepared by the methods of Examples XVIII, XIX and XX. These compounds are listed in Table IV and Table V.

TABLE IV

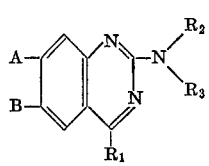

| A | B | $R_1$ | $R_2$ | $R_3$ |
|---|---|---|---|---|
| $CH_3O-$ | $CH_3O-$ | $C_4H_9$ | $H-$ | $CH_3-CH-CH-(CH_2)_3-$ <br> $\quad\quad\quad\quad\ \ \, \mid$ <br> $\quad\quad\quad\quad\ \ \, CH_3$ |
| $C_3H_7O-$ | $C_4H_9O-$ | $C_6H_{13}-$ | $CH_3-\underset{\underset{CH_3}{\mid}}{\overset{\overset{CH_3}{\mid}}{C}}-$ | $H-$ |
| $(CH_3)_2CHO-$ | $C_5H_{11}O-$ | $CH_3-$ | $C_6H_5-$ | $C_6H_5CH_2-$ |
| $(CH_3)_2CHO-$ | $CH_3O-$ | $CH_3-$ | $C_6H_5(CH_2)_2-$ | $C_6H_5(CH_2)_4-$ |
| $CH_3O-$ | $CH_3O-$ | $CH_3-$ | $CH_2=CH-CH_2-$ | $CH_2=CHCH_2-$ |
| $C_2H_5O-$ | $CH_3O-$ | $CH_3-$ | $CH_2=CH-CH-$ <br> $\quad\quad\quad\quad\ \ \, \mid$ <br> $\quad\quad\quad\quad\ \ \, CH_3$ | $HOCH_2-CH_2-$ |
| $C_2H_5O-$ | $CH_3O-$ | $CH_3-$ | $HO(CH_2)_3-$ | $HO(CH_2)_6-$ |
| $C_2H_5O-$ | $CH_3O-$ | $C_2H_5-$ | Cyclopropyl- | $H-$ |
| $C_3H_7O-$ | $CH_3O-$ | $CH_3-$ | Cyclohexyl- | Cyclopropyl- |
| $CH_3$ | $CH_3$ | $CH_3$ | $H$ | $C_2H_5$ |
| $H$ | $CH_3O$ | $CH_3$ | $H$ | $HO(CH_2)_2-$ |
| $OH$ | $OH$ | $CH_3$ | $C_6H_5$ | $CH_3$ |
| Benzo | | $CH_3$ | $CH_3$ | $C_3H_7$ |
| $C_2H_5O$ | $H$ | $CH_3$ | $CH_3$ | $H$ |
| $-O-CH_2-O-$ | | $CH_3$ | $CH_3$ | $C_6H_5CH_2-$ |
| $-O-(CH_2)_2-O-$ | | $H$ | $CH_3$ | $H-$ |
| $-O-(CH_2)_4-O-$ | | $C_2H_5$ | $CH_3$ | $C_3H_7$ |

TABLE V

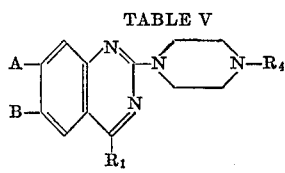

| A | B | $R_1$ | $R_4$ |
|---|---|---|---|
| $CH_3O-$ | $CH_3O-$ | $CH_3-$ | $CH_3-$ |
| $C_2H_5O$ | $C_3H_7O-$ | $C_2H_5-$ | $(CH_3)_2CH(CH_2)_2-$ |
| $CH_3O-$ | $CH_3O-$ | $C_3H_7-$ | $CH_3-CH-(CH_2)_3-$ <br> $\quad\quad\quad\quad\ \ \, \mid$ <br> $\quad\quad\quad\quad\ \ \, CH_3$ |

TABLE V.—Continued

| | | | |
|---|---|---|---|
| $CH_3O-$ | $CH_3O-$ | $C_6H_{13}-$ | $H-$ |
| $CH_3O-$ | $CH_3O-$ | $C_2H_5-$ | $CH_2=CH-CH_2-$ |
| $CH_3O-$ | $CH_3O-$ | $CH_3-$ | $CH_3CH=CHCH_2-$ |
| $CH_3O-$ | $C_2H_5O-$ | $CH_3-$ | $CH_3CH=C-CH_2-$ <br> $\quad\quad\quad\quad\ \ \, \mid$ <br> $\quad\quad\quad\quad\ \ \, CH_3$ |
| $CH_3O-$ | $C_2H_5O-$ | $CH_3-$ | Phenyl- |
| $CH_3O-$ | $C_2H_5O-$ | $CH_3-$ | $\alpha$-Naphthyl- |
| $CH_3O-$ | $CH_3O-$ | $C_2H_5-$ | $CH_3CO-$ |
| $CH_3O-$ | $CH_3O-$ | $CH_3-$ | $CH_2-CH(CH_2)_3-CO-$ <br> $\quad\quad\ \ \, \mid$ <br> $\quad\quad\ \ \, CH_3$ |
| $CH_3O-$ | $C_2H_5O-$ | $C_2H_5-$ | $CH_3(CH_2)_3CO-$ |
| $CH_3O-$ | $CH_3O-$ | $C_3H_7-$ | $CH_2=CH-OOC-$ |
| $CH_3O-$ | $C_2H_5O-$ | $C_2H_5-$ | $H_3C-CH=CH-OOC-$ |
| $C_2H_5O-$ | $CH_3O-$ | $CH_3-$ | $CH_3CH=CHCH_2-OOC-$ |
| $CH_3O-$ | $CH_3O-$ | $C_6H_{13}-$ | $\alpha$-Naphthoyl- |
| $CH_3O-$ | $CH_3O-$ | $H-$ | $\beta$-Naphthoyl- |
| $C_2H_5O-$ | $C_2H_5O-$ | $CH_3-$ | 2,5-dimethylphenyl- |
| $OH$ | $OH$ | $CH_3$ | $H-$ |
| Benzo | | $CH_3$ | $H-$ |
| $-O-CH_2-O-$ | | $CH_3$ | $H-$ |
| $-O-(CH_2)_4-O-$ | | $CH_3$ | $H-$ |
| $H$ | $CH_3O$ | $CH_3$ | $H-$ |
| $CH_3$ | $CH_3$ | $CH_3$ | $H-$ |
| $C_2H_5O-$ | $C_3H_7O-$ | $C_5H_{11}-$ | $CH_3-OOC-$ |
| $C_2H_5O-$ | $CH_3O-$ | $C_5H_{11}-$ | $(CH_3)_2CH(CH_2)_2-OOC-$ |
| $CH_3O-$ | $CH_3O-$ | $C_4H_9-$ | $CH_3-CH_2-CH-CH_2-OOC-$ <br> $\quad\quad\quad\quad\quad\quad\ \ \, \mid$ <br> $\quad\quad\quad\quad\quad\quad\ \ \, CH_3$ |
| $CH_3O-$ | $CH_3O-$ | $C_2H_5-$ | Benzoyl- |

Example XXVIII.—2-(homopiperazino-1-)-4-alkyl-6,7-dialkoxyquinazolines

The 2-(homopiperazino - 1) - 4 - alkyl - 6,7-dialkoxyquinazolines, related compounds and their pharmaceutically-acceptable addition salts are prepared by the methods of Examples XVIII, XIX, and XX. The compounds are listed in Table V with reference to the following formula:

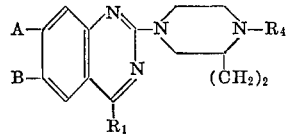

Example XXIX.—Bronchodilator activity

Conscious female guinea pigs, which had been fasted for 12 hours, received oral or parenteral dosages of the compound which was to be tested for effectiveness. Control animals received doses of saline solution which did not contain the compound which was under test. Subsequent to this administration, each animal was challenged with histamine aerosol.

The challenge procedure consisted of spraying a 0.4 percent aqueous solution of histamine, at a pressure of 5 lb./in.$^2$ into an 8 x 8 x 12 inch plastic container for one minute. Immediately after the container was subjected to the histamine spray the animal was placed within it. At the end of one minute of exposure, the respiratory status, which is a reflection of bronchoconstriction, was evaluated. Evaluation levels were designated and scored as normal breathing (0), slightly deepened breathing (1), labored breathing (2), severely labored breathing and ataxia (3) and unconsciousness (4). Each group of animals contained 8 to 10 individuals and a control group containing the same approximate number was used. The scores for the control group and the group which had been treated with the compound under test were compared and the difference was expressed as percent protection.

Thes doses, which were given orally, were 60 mg./kg. and the animals were challenged with histamine 60 minutes later. The standard compound used was theophylline which gave 25 percent protection afte ra dose of 60 mg./kg. was administered orally and the animal was challenged one hour later. When the compounds listed in Table VI below were administered according to this procedure and the animals were challenged accordingly, the following percent protection was observed.

TABLE VI

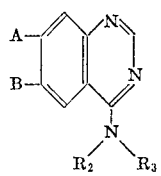

| A | B | R$_2$ | R$_3$ | Percent protection |
|---|---|---|---|---|
| (CH$_3$)$_2$CH—O— | (CH$_3$)$_2$CH—O— | H— | H— | 19 |
| CH$_3$O— | CH$_3$O— | H— | H— | 42 |
| CH$_3$O— | CH$_3$O— | H— | CH$_3$— | 52 |
| CH$_3$O— | CH$_3$O— | H— | CH$_3$CH$_2$— | 22 |
| CH$_3$O— | CH$_3$O— | H— | CH$_3$(CH$_2$)$_2$— | 10 |
| CH$_3$O— | CH$_3$O— | H— | (CH$_3$)$_2$CH— | 41 |
| CH$_3$O— | CH$_3$O— | H— | Cyclopropyl— | 31 |
| CH$_3$O— | CH$_3$O— | CH$_3$— | CH$_3$— | 47 |
| CH$_3$O— | CH$_3$O— | CH$_3$CH$_2$— | CH$_3$CH$_2$— | 53 |

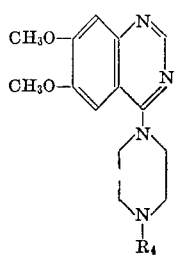

| R$_4$ | Percent protection |
|---|---|
| C$_6$H$_5$— | 27 |
| CH$_3$CH$_2$—OOC— | 28 |
| CH$_3$CH$_2$CH$_2$OOC— | 40 |
| CH$_3$(CH$_2$)$_3$OOC— | 14 |
| (CH$_3$)$_2$CHCH$_2$OOC— | 50 |
| CH$_3$(CH$_2$)$_4$OOC— | 20 |
| CH$_3$(CH$_2$)$_5$OOC— | 13 |
| CH$_3$OC— | 16 |
| CH$_3$(CH$_2$)$_5$OC— | 23 |
| (Cl)$_3$COC— | 16 |

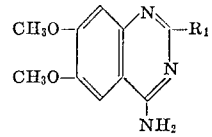

| R$_1$ | Percent protection |
|---|---|
| H— | 42. |
| CH$_3$CH$_2$— | 32. |
| CH$_3$— | Short duration. |

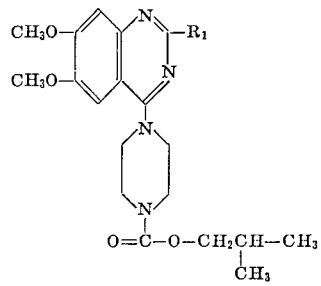

| R$_1$ | Percent protection |
|---|---|
| H— | 50. |
| CH$_3$— | 40 (after 15 minutes). |
| CH$_3$CH$_2$— | 56. |
| CH$_3$CH$_2$CH$_2$— | 53. |
| (CH$_3$)$_2$CH— | 23. |
| (CH$_3$)$_3$C— | 19. |

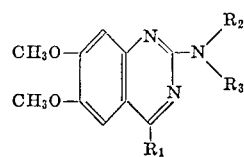

| R$_1$ | R$_2$ | R$_3$ | Percent protection |
|---|---|---|---|
| CH$_3$— | H— | H— | 41 |
| CH$_3$— | CH$_3$CH$_2$— | CH$_3$CH$_2$— | 53 |
| CH$_3$— | CH$_3$— | CH$_3$— | 27 |

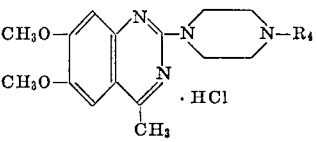

| R$_4$ | Percent protection |
|---|---|
| C$_6$H$_5$C— (with O double bond) | 22 |
| CH$_3$CH$_2$OOC— | 41 |
| CH$_2$=CHCH$_2$— | 16 |

Example XXX.—Anti-hypertensive activity

Hypotensive activity was measured in hypertensive conscious dogs with systolic blood pressures of at least 160 mm. Hg. The hypertension was produced by the techniques given by Goldblatt, H., Lynch, J., Hansel, R. F., Summerville, W. W., J. Exp. Med., 59, 340, (1934)

and by Grimson, K. S., Proc. Soc. Exp. Biol, 44, 291, (1940) Dogs with spontaneous hypertension were also used.

Blood pressure was measured in the morning prior to drug administration and, subsequently, at 2, 4, and 24 hours after treatment with the compound under test. The compounds were administered orally in the form of capsules over a period of 1 to 3 days. The usual dosage was 2.5 mg./kg. on the first day and 10, 20 or 40 mg./kg. on subsequent days. Electrocardiograms were recorded simultaneously with the blood pressure. The response of the hyptertensive dogs to the compounds which were administered are shown in Table VII below.

TABLE VII

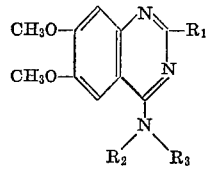

| $R_1$ | $R_2$ | $R_3$ | Daily dosage, mg./kg. | Blood pressure depression, mm. Hg |
|---|---|---|---|---|
| $CH_3CH_2-$ | H— | H— | 2.5 | 38.0 |
| H— | H— | H— | 10.0 | 45.0 |
| $CH_3CH_2CH_2-$ | H— | H— | 10.0 | 30.0 |
| $CH_3-$ | H— | H— | 20.0 | 22.0 |
| $CH_3-$ | H— | H— | 20.0 | 27.0 |

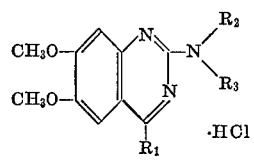

| $R_1$ | $R_2$ | $R_3$ | Daily dosage, mg./kg. | Blood pressure depression, mm. Hg |
|---|---|---|---|---|
| $CH_3-$ | $CH_3CH_2-$ | $CH_3CH_2-$ | 20.0 | 58.0 |

Example XXXI.—Tablets

A tablet base is prepared by blending the following ingredients in the proportion by weight indicated:

Sucrose, U.S.P. ------------------------------- 80.3
Tapioca starch ------------------------------- 13.2
Magnesium stearate --------------------------- 6.5

Into this tablet base there is blended sufficient 4-(6,7-dimethoxyquinazolin-4-yl) - piperazine-1-carboxylic acid, isobutyl ester hydrochloride to provide tablets containing 20, 100 and 250 mg. of active ingredient per tablet.

Example XXXII.—Capsules

A blend is prepared containing the following ingredients:

Calcium carbonate, U.S.P. ----------------------- 17.6
Dicalcium phosphate ---------------------------- 18.8
Magnesium trisilicate, U.S.P. ------------------- 5.2
Lactose, U.S.P. -------------------------------- 5.2
Potato starch ---------------------------------- 5.2
Magnesium stearate A --------------------------- 0.8
Magnesium stearate B --------------------------- 0.35

To this blend is added sufficient 4-(6,7-dimethoxyquinazolin-4-yl)-piperazine - 1 - carboxylic acid, isobutyl ester hydrochloride to provide capsules containing 20, 100 and 250 mg. of active ingredient per capsule.

Example XXXIII.—Injectable preparation

One thousand grams of 4-(6,7-dimethoxyquinazolin-4-yl)-piperazine-1-carboxylic acid, isobutyl ester hydrochloride are intimately mixed and ground with 2500 grams of sodium ascorbate. The ground dry mixture is placed in vials and sterilized with ethylene oxide after which the vials are sterilely stoppered. For intravenous administration, sufficient water is added to the materials in the vials to form a solution containing 10 mg. of active ingredient per milliliter of injectable solution.

Example XXXIV.—Suspension

A suspension of 2-ethyl-4-amino-6,7-dimethoxyquinazoline is prepared with the following composition:

Effective ingredient—31.42 g.
70% aqueous sorbitol—741.29 g.
Glycerine, U.S.P.—185.35 g.
Gum acacia (10% solution)—100.0 ml.
Polyvinylpyrrolidone—0.5 g.
Distilled water—Sufficient to make 1 liter.

To this suspension, various sweeteners and flavorants may be added to improve the palatability of the suspension. The suspension contains approximately 25 mg. of effective agent per milliliter.

Example XXXV.—Solution

A solution of 2-ethyl-4-amino-6,7-dimethoxyquinazoline is prepared with the following composition:

Effective ingredient—30.22 grams
Magnesium chloride hexahydrate—12.36 grams
Monoethanolamine—8.85 ml.
Propylene glycol—376.0 grams
Water, distilled—94.0 ml.

The resultant solution has a concentration of effective ingredient of 50 mg./ml. and is suitable for parenteral and especially for intramuscular administration.

Example XXXVI.—Preparation of 4 - (6,7 - dimethoxyquinazolin-4-yl)-piperazine - 1 - carboxylic acid, 2-methyl-2-chloropropyl ester To a cold (0° C.) solution of 2.74 g. (0.010 mole) of 4-piperazinyl-6,7-dimethoxyquinazoline, prepared by the method of Example VII, and 1.10 g. (0.010 mole) of triethylamine in 40 ml. of methylene chloride was added a solution of 1.7 g. (0.010 mole), of 2-methyl-2-chloropropyl chloroformate in 20 ml. of methylene chloride, dropwise, over 10 minutes. After warming to room temperature, the cloudy mixture was diluted with 50 ml. of methylene chloride, washed with 50 ml. of water and dried over sodium sulfate. Evaporation of the solvent left 4.3 g. of white crystalline solid, M.P. 140–146° C. Recrystallization from acetone-water mixture produced 2.6 g. (63.5%) of the analytical sample as a white crystalline solid, M.P. 158–159° C.

Analysis.—Calcd. for $C_{19}H_{25}O_4N_4Cl$ (percent): C, 55.80; H, 6.19; N, 13.70; Cl, 8.67. Found (percent): C, 55.50; H, 6.15; N, 13.77; Cl, 8.59.

Example XXXVII.—Preparation of 4 -(6,7 - dimethoxyquinazolin-4-yl)-piperazine - 1 - carboxylic acid, 2-methyl-2-hydroxypropyl ester A solution of 6.0 g. (0.0147 mole) of crude 4-(6,7-dimethoxyquinazolin-4-yl) - piperazine - 1 - carboxylic acid, 2-methyl-2-chloropropyl ester in 225 ml. of 0.1 N hydrochloric acid was allowed to reflux for 1 hour. The cooled solution was extracted with three 100 ml. portions of methylene chloride, and the aqueous phase subsequently made basic with dilute sodium hydroxide solution and extracted with three 100 ml. portions of methylene chloride. These latter organic extracts were combined, dried over sodium sulfate and evaporated and the resulting residue recrystallized from a chloroform-ethyl acetate mixture to separate 2.1 g. (37%) of white prisms M.P. 199–200° C.

Analysis.—Calcd. for $C_{19}H_{26}O_5N_4$ (percent): C, 58.45; H, 6.71; N, 14.35. Found (percent): C, 58.36; H, 6.63; N, 14.62.

Example XXXVIII.—Preparation of 4-(6,7 - dimethoxyquinazolin-4-yl)-piperazine-1-carboxylic acid, 2-methyl-2-propenyl ester, hydrochloride A mixture of 40.4 g. (0.18 mole) of 4-chloro-6,7-dimethoxyquinazoline, prepared by the method of Part B of Example V, and 33.0 g. (0.18 mole) of piperazine-1-carboxylic acid, 2-methyl-2-propenyl ester in 400 ml. of ethanol was refluxed for 4 hours and then evaporated to dryness to leave 73 g. (100%) of crystalline solid. This was dissolved in 600 ml. of water and extracted with four 500 ml. portions of methylene chloride. The combined extracts were evaporated to a volume of 500 ml. and ethyl acetate added until crystallization began. Filtration separated 48.0 g. (65%) of the hydrochloride salt of the product as a pale yellow microcrystalline solid M.P. 212–213° C. (dec.).

A second crop (6.2 g., 8.4%) of product as a yellow microcrystalline solid, M.P. 210–213° C. (dec.) was obtained by concentration of the filtrate. This material was homogenous by thin layer chromatography.

Example XXXIX.—Preparation of 4 - (6,7 - dimethoxyquinazolin-4-yl)-piperazine-1-carboxylic acid, 2-methyl-2-hydroxypropyl ester To 200 ml. of 50% sulfuric acid-water mixture was added 25 g. (0.0615 mole) of 4-(6,7-dimethoxyquinazolin-4-yl)-piperazine-1-carboxylic acid, 2 - methyl-2-propenyl ester, hydrochloride. The resulting yellow solution was stirred at room temperature for 1 hour, poured into 200 g. of ice and made basic with 40% sodium hydroxide solution, keeping the temperature below 40° C. The resulting solution was extracted with four 200 ml. portions of methylene chloride, and the combined organic extracts were extracted with 0.5 N hydrochloric acid and finally with three 100 ml. portions of water. The combined aqueous extracts were made basic with 40% sodium hydroxide solution and extracted with three 200 ml. portions of methylene chloride. The latter methylene chloride extracts were combined, dried over sodium sulfate and evaporated to leave 18.0 g. (75%) of crystalline solid M.P. 192–195° C. This was recrystallized from chloroform-ethyl acetate mixture to separate 14.5 g. (80%) of analytically pure product M.P. 198–199.5° C.

Example XL

Five parts, by weight, of the 4-(6,7-dimethoxyquinazolin-4-yl)-piperazine-1-carboxylic acid, 2-methyl-2-hydroxypropyl ester is dissolved in pyridine at 0° C. and an excess of propionyl chloride is added, dropwise. At the completion of the addition, the resulting mixture is refluxed for 1 hour, cooled, diluted with water and extracted three times with methylene chloride. After washing, the combined methylene chloride layers with dilute acid, they are dried and evaporated to dryness to give 4-(6,7-dimethoxyquinazolin-4-yl)-piperazine - 1 - carboxylic acid, 2-methyl-2-propionoxypropyl ester which is purified by recrystallization if necessary.

In a similar manner, the 2-methyl-2-butyryloxypropyl ester, the 2-methyl-2-napthoyloxypropyl ester, the 2-methyl-2-benzoxypropyl ester and the 2-methyl-2-acetoxypropyl ester are prepared.

Example XLI.—Preparation of 4 - (6,7 - dimethoxyquinazolin-4-yl)-piperazine - 1 - carboxylic acid, 2-dimethylaminoethyl ester Part A: Preparation of 4-(6,7-dimethoxyquinazolin-4-yl)-piperazine-1-thiol carboxylic acid, phenyl ester.—To a cold (0°) solution of 20.0 g. (0.073 mole) of 4-piperazinyl-6,7-dimethoxyquinazoline, prepared by the methods of Example VII, and 8.05 g. (0.084 mole) of triethylamine in 150 ml. of methylene chloride was added, dropwise, 12.9 g. (0.075 mole) of phenyl chlorothiolformate. The resulting mixture was allowed to stir at room temperature for 15 minutes and 100 ml. of methylene chloride was added. This solution was washed with two 50 ml. portions of water, dried over sodium sulfate and evaporated to separate 27.46 g. of crude product, M.P. 146–151° C. Recrystallization from 500 ml. of methanol separated 15.84 g. (53%) of product as a pale yellow microcrystalline solid, M.P. 170–173° C. An additional 5.59 g. (19%), M.P. 166–170° C., of product was obtained from further concentration of the mother liquor.

Part B: Preparation of 4-(6,7-dimethoxyquinazolin-4-yl-6,7dimethovyquinazoline, prepared by the methods of ester.—To a suspension of 1.60 g. (0.044 mole) of sodium hydride (60% mineral oil dispersion) in 50 ml. of tetrahydrofuran was added 3.92 g. (0.044 mole) of 2-dimethylaminoethanol and the solution refluxed until gas evolution ceased (45 minutes). The resulting solution was cooled to room temperature and a solution of 4.1 g. (0.01 mole) of 4-(6,7 - dimethoxyquinazolin-4-yl)-piperazine-1-thiol carboxylic acid, phenyl ester in 15 ml. of tetrahydrofuran was added at once and the solution stirred at room temperature for 45 minutes. After dilution with 50 ml. of water, the solution was concentrated to remove the tetrahydrofuran, and extracted with four 50 ml. portions of methylene chloride. The combined extracts were dried over sodium sulfate and evaporated to separate 4.39 g. of crude product, M.P. 110–114° C. Recrystallization from ethylacetate-hexane mixture gave 2.52 g. (65%) of product as an off-white microcrystalline solid M.P. 100–104° C.

The corresponding hydrochloride evidenced a melting point of 230–232° C.

In a similar manner, the compound 4-(6,7-dimethoxyquinazolin-4-yl)-piperazine - 1 - carboxylic acid, 2-diethylaminoethyl ester was prepared, M.P. 90–93° C.; recrystallized from isopropyl ether; M.P. of hydrochloride 151° C.

Example XLII

When the procedures of Example XLI are employed, using the appropriate aminoalkanol or aminocarbinol in the procedure of Part B of Example XLI and the product of Part A of Example XLI, the 4-(6,7-dimethoxyquinazolin-4-yl) - 1 - carboxylic acid, 2-methyl-2-ethylmethylaminopropyl ester, the 2-methyl-2-aminopropyl ester, the 2-methyl-2-anilinopropyl ester, the 2-methyl-2-butylaminopropyl ester, the 2-methyl-2-m-tolylaminopropyl ester, the 2-methyl-2-naphthylaminopropyl ester, the 2-methyl-2-pyrrolidinylpropyl ester, the 2-methyl-2-piperidinylpropyl ester and the 2-methyl-2-homopiperidinylpropyl ester are produced.

When the procedures of Example XLI are employed, using the appropriate 2-alkoxycarbinol, 2-alkoxyalkanol, 2-aryloxycarbinol or 2-aryloxyalkanol in place of the 2-dimethylaminoethanol of Part B of Example XLI together with the product of Part A of Example XLI, the 4-(6,7-dimethoxyquinazolin-4-yl)-piperazine - 1 - carboxylic acid, 2-methyl-2-propoxypropyl ester, the 2-methyl-2-isobutoxypropyl ester, the 2-methyl-2-phenoxypropyl ester, the 2-methyl-2-naphthoxypropyl esters, the 2-methyl-2-xyloylpropyl ester and the 2-methyl-2-methoxypropyl ester may be formed.

Example XLIII

Five parts, by weight of 4-(6,7-dimethoxyquinazolin-4-yl)-piperazine-1- carboxylic acid, 2-methyl-2-aminopropyl ester, prepared by the method of Example XLI, is dissolved in pyridine. To the solution is added, dropwise, at 0° C., a slight excess of propionyl chloride. After the addition is complete, the resultant mixture is heated at reflux. The cooled mixture is diluted with water and the product 4-(6,7-dimethoxyquinazolin - 4 - yl)-piperazine-1-carboxylic acid, 2-methyl-2-ethamidopropyl ester is removed by filtration or extraction of the aqueous solution with methylene chloride.

In a similar manner, the 2-methyl-2-formamidopropyl ester and the 2 - methyl-2-butyramidopropyl ester are formed.

Example XLIV

The methods of Examples I, XXXVI, XXXVII, XXXIX, XL, XLI, XLII and XLIII are used to prepare the following compounds:

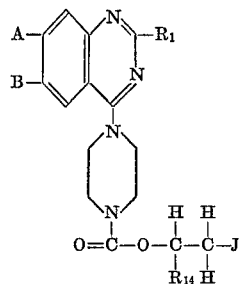

| A | B | $R_1$ | $R_{14}$ | J |
|---|---|---|---|---|
| $CH_3O$ | $C_3H_7O$ | $CH_3$ | $CH_2OH$ | OH |
| $CH_3O$ | $CH_3CHCH_3$<br>$\|$<br>$CH_2$<br>$\|$<br>O | $C_3H_7$ | $CH_3$ | OH |
| $C_6H_{13}O$ | $CH_3O$ | Isobutyl | $C_2H_5$ | Cl |
| $CH_3-CH-CH_3$<br>$\|$<br>$(CH_2)_3$<br>$\|$<br>O | $CH_3O$ | $C_6H_{13}$ | $CH_3$ | OH |
| OH | OH | $CH_3$ | H | OH |
|  | Benzo |  |  |  |
| $CH_3$ | $CH_3O-$ | $CH_3$ | H | OH |
| $CH_3$ | $CH_3$ | $CH_3$ | H | H |
| H | $CH_3O$ | H | H | Cl |
|  | $-O-CH_2-O-$ | H | H | Br |
|  | $-O-(CH_2)_4-O-$ | H | H | $CH_3$ |
| $CH_3O$ | H | H | Isobutyl | OH |

Structure with $CH_3O$ substituents on quinazoline ring, piperazinyl, with $O=C-O-C(R_5)(R_{15})-C(R_{13})(R_{15})-J$

| $R_5$ | $R_{13}$ | $R_{14}$ | $R_{15}$ | J |
|---|---|---|---|---|
| $CH_3$ | H | $CH_3$ | H | H |
| $C_2H_5$ | H | H | $C_2H_5$ | OH |
| Isobutyl | H | H | H | Br |
| $CH_3$ | $CH_3$ | $C_2H_5$ | H | Cl |
| $CH_3$ | H | Isobutyl | H | $NH_2$ |
| $CH_2OH$ | H | H | Isobutyl | H |
| $CH_3$ | Isobutyl | H | $CH_2OH$ | H |
| $CH_3$ | $C_3H_7$ | H | H | $-O-\overset{O}{\overset{\|}{C}}-\overset{CH_3}{\overset{\|}{CH}}-CH_3$ |
| H | H | H | H | $-O-\overset{O}{\overset{\|}{C}}-$ (2-naphthyl) |
| H | $CH_3$ | H | H | $-O-\overset{O}{\overset{\|}{C}}-$ (3-methylphenyl) |
| H | H | H | H | $-O-\overset{O}{\overset{\|}{C}}-$ (3-propyl-5-methylphenyl) |
| $-(CH_2)_4-$ |  | H | $CH_3$ | $-O-\overset{O}{\overset{\|}{C}}-CH_3$ |
| $-(CH_2)_7-$ |  | $C_2H_5$ | H | $-O-\overset{O}{\overset{\|}{C}}-H$ |
| H | H | H | H | $-\overset{H}{\overset{\|}{N}}-\overset{O}{\overset{\|}{C}}-$ phenyl |
| H | H | $CH_3$ | H | $-\overset{H}{\overset{\|}{N}}-\overset{O}{\overset{\|}{C}}-$ (2-naphthyl) |
| $CH_3$ | H | H | H | $-\overset{H}{\overset{\|}{N}}-\overset{O}{\overset{\|}{C}}-$ (3-methyl-5-propylphenyl) |
| H | $CH_3$ | $CH_3$ | H | $-N(CH_3)_2$ |
| H | $C_2H_5$ | H | H | $-N(C_2H_5)(CH(CH_3)_2)$ |
| H | H | H | H | $-\overset{H}{\overset{\|}{N}}-$ (2-naphthyl) |
| H | H | H | H | $-\overset{H}{\overset{\|}{N}}-$ (3-methylphenyl) |
| $CH_3$ | H | H | H | $-\overset{H}{\overset{\|}{N}}-$ (3-methyl-5-propylphenyl) |
| H | H | H | H | $-N$(piperidinyl) |
| H | H | $CH_3$ | H | $-N(H)(C_2H_5)$ |
| H | H | H | $CH_3$ | $-N$(pyrrolidinyl) |

Example XLV

The methods of Examples I, XXXVI, XXXVII, XXXVIII, XXIX, XL, XLI, XLII and XLIII are used to prepare the following compounds:

Structure with A and $CH_3O$ on quinazoline, $R_1$, piperazinyl, $O=C-O-C(R_5)(H)-C(R_{13})(CH_3)-J$

| A | $R_1$ | $R_5$ | $R_{13}$ | J |
|---|---|---|---|---|
| $CH_3O$ | H | H | H | H |
| $C_3H_7O$ | $CH_3$ | $CH_3$ | $CH_3$ | OH |
| Isobutoxy | $C_3H_7$ | H | H | $NH_2$ |
| $C_6H_{13}$ | H | —$(CH_2)_5$— | | Cl |
| OH | $CH_3O$ | $C_2H_5$ | H | —N(H)—C(=O)—H |

Examples XLVI.—Preparation of 4-(6,7-dimethyoxyquinolin-4-yl)-piperazine-1-carboxylic acid, isobutyl ester A mixture of 3.4 g. (0.0152 mole) of 4-chloro-6,7-dimethoxyquinoline, prepared by the general methods given by B. Regel et al., J. Am. Chem. Soc., 68, 1264 (1964), and 5.65 g. (0.031 mole) of piperazine-1-carboxylic acid, isobutyl ester in 80 ml. of ethanol was heated at 130° C. for 2 hours. The resulting solution was concentrated to dryness and the residue slurried in water and filtered to separate 6.1 g. of crude product. Recrystallization from 50 ml. of ethanol afforded 4.3 g. (76%) of an off-white crystalline product, M.P. 172–173° C.

Analysis.—Calc'd. for $C_{20}H_{27}O_4N_3$ (percent): C, 64.32; H, 7.29; N, 11.25. Found (percent): C, 64.13; H, 7.16; N, 11.36.

Example XLVII.—Preparation 4 - (6,7 - dimethoxyquinolin - 4 - yl)-piperazine-1-carboxylic acid, 2-methyl-2-hydroxypropyl ester.

The methods used in Example XXXIX were used to prepare the 2-methyl-2-hydroxypropyl ester which evidenced a melting point of 172–173° C. and was recrystallized from ethyl acetate.

Example XLVIII

The methods of Examples XXXVI, XXXVII, XXXVIII, XXXIX, XL, XLI, XLII, XLIII, XLVI, and XLVII are used to prepare compounds of the following formulae:

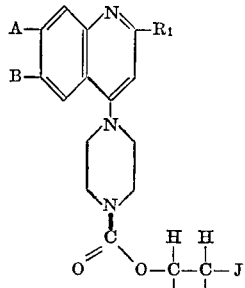

| A | B | $R_1$ | $R_{14}$ | J |
|---|---|---|---|---|
| $CH_3O$ | $C_3H_7O$ | $CH_3$ | $CH_2OH$ | OH |
| $CH_3O$ | $CH_3CHCH_3$ / $CH_2$ / O | $C_3H_7$ | $CH_3$ | OH |
| $C_6H_{13}O$ | $CH_3O$ | Isobutyl | $C_2H_5$ | Cl |
| $CH_3$—CH—$CH_3$ / $(CH_2)_3$ / O | $CH_3O$ | $C_6H_{13}$ | $CH_3$ | OH |
| OH | OH | $CH_3$ | H | OH |
| Benzo | | $CH_3$ | H | OH |
| $CH_3$ | $CH_3O$— | H | H | H |
| $CH_3$ | $CH_3$ | $CH_3$ | H | H |
| H | $CH_3O$ | $CH_3$ | H | Cl |
| —O—$CH_2$—O— | | H | H | Br |
| —O—$(CH_2)_4$—O— | | H | H | $CH_3$ |
| $CH_3O$ | H | H | Isobutyl | OH |

Example XLIX

The methods of Examples XXXVI, XXXVII, XXXVIII, XXXIX, XL, XLI, XLII, XLIII, XLVI and XLVII are used to prepare compounds of the following formula:

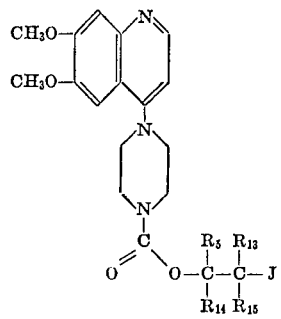

| $R_5$ | $R_{13}$ | $R_{14}$ | $R_{15}$ | J |
|---|---|---|---|---|
| $CH_3$ | H | $CH_3$ | H | H |
| $C_2H_5$ | H | H | $C_2H_5$ | OH |
| Isobutyl | H | H | H | Br |
| $CH_3$ | $CH_3$ | $C_2H_5$ | H | Cl |
| $CH_3$ | H | Isobutyl | H | $NH_2$ |
| $CH_2OH$ | H | H | Isobutyl | H |
| $CH_3$ | Isobutyl | H | $CH_2OH$ | H |

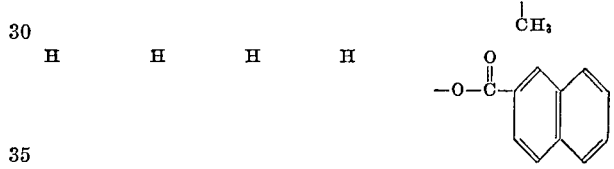

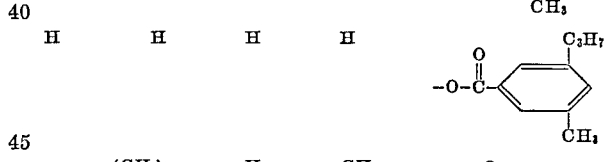

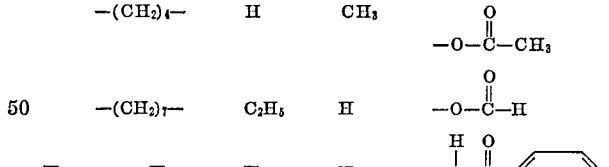

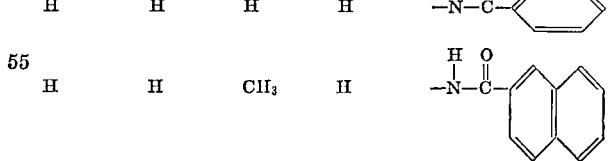

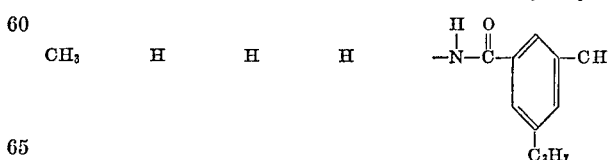

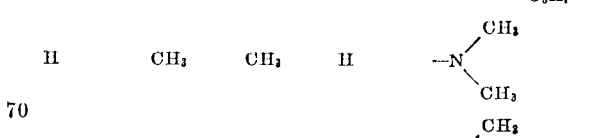

| $R_5$ | $R_{13}$ | $R_{14}$ | $R_{15}$ | J |
|---|---|---|---|---|
| H | H | H | H | —NH—(naphthalen-2-yl) |
| H | H | H | H | —NH—C₆H₄—CH₃ |
| CH₃ | H | H | H | —N(CH₃)—C₆H₄—C₃H₇ |
| H | H | H | H | —N(CH₂(CH₂)₅CH₂) (piperidino) |
| H | H | CH₃ | H | —N(CH₃)(C₂H₅) |
| H | H | H | CH₃ | —N(CH₂(CH₂)₂CH₂) (morpholino-like, N with -CH₂(CH₂)₂CH₂-) |
| H | H | CH₃ | H | —NH—CH=O |
| H | CH₃ | CH₃ | H | —O—CH₃ |
| H | H | H | CH₃ | —O—C₂H₅ |
| H | CH₃ | H | H | —O—CH(CH₃)(C₂H₅) |
| CH₃ | H | H | H | —O—C₆H₅ |
| H | CH₃ | C₂H₅ | H | —O—(naphthalen-2-yl) |
| H | H | H | H | —O—C₆H₃(CH₃)(C₃H₇) |
| H | H | H | H | —NH—C(=O)—CH₃ |
| H | H | H | H | —NH—C(=O)—C₂H₅ |
| H | CH₃ | H | H | —NH—C(=O)—CH(CH₃)(C₂H₅) |
| CH₃ | H | H | H | —NH₂ |
| CH₃ | H | H | H | —NH—C₆H₅ |
| H | H | H | H | —N(C₆H₅)₂ |
| H | H | H | H | —N(CH₃)—(naphthalen-1-yl) |
| H | H | H | H | —N(CH₃)—C₆H₃(CH₃)(C₃H₇) |

Example L.—Preparation of 4-(6,7-dimethoxyisoquinolin-1 - yl) - piperazine - 1 - carboxylic acid, isobutyl ester Part A: Preparation of N-carbethoxyhomoveratryl-amine.—To a solution of 362 g. (2.0 moles) of homoveratrylamine in 500 ml. dry benzene was added a solution of 109 g. (1.0 mole) of ethyl chloroformate in 200 ml. of benzene, dropwise, keeping the temperature at 50–55° C. The resulting slurry was stirred for 16 hours at room temperature and poured into 500 ml. of water. The benzene layer was separated, washed with 500 ml. of saturated sodium bicarbonate solution and dried over sodium sulfate. Evaporation of solvent and distillation of the residual oil afforded 186 g. (74%) of clear colorless liquid; B.P. 174–177° C. (0.2 mm.), which crystallized on standing to give the product as a white crystalline solid, M.P. 61–62° C.

Part B: Preparation of 6,7 - dimethoxy-3,4-dihydro-1(2H)-isoquinolinone.—To one liter of stirred polyphosphoric acid was added 330 g. (1.3 moles) of N-carbethoxyhomoveratrylamine. The resulting mixture was stirred at 140° C. for 30 minutes and poured onto 2 liters of ice-water. The aqueous solution was made basic with ammonium hydroxide and extracted several times with chloroform. The combined extracts were dried over sodium sulfate and evaporated to dryness. The residue was recrystallized from methylene chloride-ethyl acetate to afford 120 g. (44.5%) of white plates, M.P. 159–161° C.

Part C: Preparation of 6,7 - dimethoxy-1(2H)-isoquinolinone.—A mixture of 46.0 g. (0.222 mole) of 6,7-dimethoxy-3,4-dihydro-1(2H)-isoquinolinone and 7.0 g. of 25% palladium on carbon was stirred at 240° C. for 30 minutes (when hydrogen evolution had ceased) under a nitrogen atmosphere. The mixture was cooled to room temperature and leached several times with hot chloroform. The combined chloroform extracts were concentrated to dryness to afford 39.0 g. (86%) of white crystalline product, M.P. 228–232° C.

Part D: Preparation of 1 - chloro-6,7-dimethoxyisoquinoline.—A mixture containing 39 g. (0.191 mole) of 6,7-dimethoxy-1(2H)-isoquinolinone and 200 ml. of phosphorous oxychloride was stirred at reflux for 1 hour. The resulting amber solution was concentrated to dryness and the residue dissolved in methylene chloride and added slowly to 100 ml. of concentrated ammonium hydroxide solution. The methylene chloride layer was separated and the aqueous layer extracted with three 100 ml. portions of methylene chloride. The combined organic extracts were dried over sodium sulfate and evaporated to afford 35.0 g. (82%) of white crystalline product, M.P. 135–137° C.

*Analysis.*—Calcd. for $C_{11}H_{10}NO_2Cl$ (percent): C, 59.07; H, 4.51; N, 6.26; Cl, 15.85. Found (percent): C, 59.33; H, 4.60; N, 6.30; Cl, 16.06.

Part E: Preparation of 4-(6,7-dimethoxyisoquinolin-1-yl)-piperazine-1-carboxylic acid, isobutyl ester.—A mixture containing 4.0 g. (0.018 mole) of 1-chloro-6,7-dimethoxy-isoquinoline and 6.7 g. (0.036 mole) of piperazine-1-carboxylic acid, isobutyl ester in 80 ml. of ethanol was heated at 130° C. for 16 hours in a closed vessel. The resulting amber solution was concentrated, slurried in water and filtered to give 4.3 g. of crude product. This was recrystallized from 30 ml. of methanol to afford 2.58 g. (38.5%) of product as slightly pink needles, M.P. 130–132° C.

*Analysis.*—Calcd. for $C_{20}H_{27}N_3O_4$ (percent): C, 64.32; H, 7.29; N, 11.25. Found (percent): C, 64.47; H, 7.16; N, 11.29.

Example LI.—Preparation of 4 - (6,7 - dimethoxyisoquinolin-1-yl)-piperazine-1-carboxylic acid esters The 1-chloro-6,7-dimethoxyisoquinoline, produced by the methods of Part D of Example L was reacted with the appropriate piperazine-1-carboxylic acid ester, according to the methods of Part E of Example L to yield the following compounds: 4 - (6,7-dimethoxyisoquinolin-1-yl)-piperazine-1-carboxylic acid, ethyl ester; M.P. 130–131° C.; recrystallized from isopropyl ether; M.P. of hydrochloride salt 107–108° C. (decomposition).

The methods of Example XXXIX were used to prepare the following compound: 4-(6,7-dimethoxyisoquinolin-1-yl)-piperazine-1-carboxylic acid, 2 - methyl-2-hydroxypropyl ester; M.P. 133–134° C.; recrystallized from ethyl acetate-hexane; M.P. of hydrochloride salt 110° C. (decomposition).

Example LII.—Preparation of 1-ethylamino-6,7-dimethoxyisoquinoline

The 1-chloro-6,7-dimethoxyisoquinoline, produced by the methods of Part D of Example L, was reacted with ethylamine, according to the methods of Part E of Example L, to yield 1-ethylamino-6,7-dimethoxyisoquinoline, which evidenced a melting point of 194–195° C. and was recrystallized from methanol-water. The hydrochloride salt evidenced a melting point of 224–225° C. (decomposition).

Example LIII.—Preparation of 1-piperazinyl-6,7-dimethoxyisoquinoline

A solution of 84.0 g. (0.243 mole) of 4-(6,7-dimethoxyisoquinolin-1-yl)-piperazine-1-carboxylic acid, ethyl ester, prepared by the methods of Example LI, in one liter of methanol and 250 ml. of 30% sodium hydroxide solution was refluxed for 18 hours. The resulting suspension was concentrated to remove the methanol, diluted with 500 ml. of water and extracted with three 250 ml. portions of methylene chloride. The combined extracts were dried over sodium sulfate and concentrated to 250 ml. To this was added 700 ml. of isopropyl ether and the solution concentrated to 300 ml., chilled in an ice bath and filtered to separate 51 g. (77%) of white crystalline product M.P. 134–135.5° C. An additional 15 g. (22.6%) of material was obtained by further concentration of the mother liquor.

Example LIV.—Preparation of 4 - (6,7 - dimethoxyisoquinolin-1-yl)-piperazine-1-carboxylic acid, 2-dimethylaminoethyl ester Part A: Preparation of 4-(6,7-dimethoxyisoquinolin-1-yl)-piperazine-1-thiol carboxylic acid, phenyl ester.—To a cold (0° C.) solution of 19.0 (0.0695 mole) of 1-piperazinyl-6,7-dimethoxyisoquinoline, prepared by the methods of Example LIII, and 7.65 g. (0.076 mole) of triethylamine in 100 ml. of methylene chloride was added, dropwise, 12.0 g. (0.0695 mole) of phenyl chlorothiolformate. The resulting suspension was allowed to stir at room temperature for 15 minutes and diluted with 100 ml. of methylene chloride. This solution was washed with two 50 ml. portions of water, dried over sodium sulfate and concentrated to a crystalline residue. The residue was recrystallized from 100 ml. of methanol to separate 18.7 g. (66%) of product as a pale yellow crystalline solid, M.P. 137–138° C.

Part B: Preparation of 4-(6,7-dimethoxyisoquinolin-1-yl) - piperazine-1-carboxylic acid, 2-dimethylaminoethyl ester.—To a suspension of 1.6 g. (0.044 mole) of sodium hydride (60% mineral oil dispersion) in 100 ml. of tetrahydrofuran was added 3.92 g. (0.44 mole) of 2-dimethylaminoethanol and the solution refluxed until gas evolution ceased (45 minutes). After cooling to room temperature 4.1 g. (0.01 mole) of 4-(6,7-dimethoxyisoquinolin-1-yl)-piperazine-1-thiolcarboxylic acid, phenyl ester was added and the solution stirred at room temperature for 30 minutes. This was diluted with 70 ml. of water and concentrated to remove the tetrahydrofuran, and the resulting solution extracted with three 100 ml. portions of methylene chloride. The combined extracts were dried over sodium sulfate and evaporated to leave a viscous oil which was triturated with isopropyl ether to separate 3.1 g. (80%) of white crystalline product M.P. 114–115° C. Recrystallization from methylene chloride-isopropyl ether mixture gave 2.3 g. of white crystalline product, M.P. 115° C.

Example LV

The procedures of Examples XXXVI, XXXVII, XXXVIII, XXXIX, XL, XLI, XLII, XLIII, XLVI, XLVII, L, LI, LII, LIII and LIV were used to produce the compounds of the following formulae:

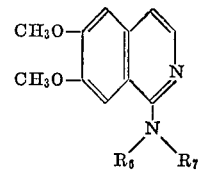

| $R_6$ | $R_7$ | M.P. base, ° C. | M.P. hydrochloride, ° C. | Recrystallization solvent. |
|---|---|---|---|---|
| H | $CH(CH_3)_2$ | 138–140 | 200–204 | Methanol. |
| $CH_3$ | $CH_3$ | 72–75 | 148–151 | Purified by chromatography. |
| $CH_2CH_3$ | $CH_2CH_3$ | 137–138.5 | 189–191 | Acetone-water. |

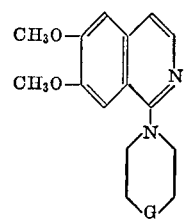

| G | M.P. base, ° C. | M.P. hydrochloride, ° C. | Recrystallization solvent |
|---|---|---|---|
| $-N-CH_3$ | 163–166 | 220–225 | Ethyl acetate. |
| $-N-C_6H_5$ | 138–141 | 222–228 | Methanol. |
| $-N-\overset{O}{\underset{\|}{C}}-CH_3$ | 137–138 | [1] 157-8 | Methylene chloride-isopropyl ether. |
| $-N-\overset{O}{\underset{\|}{C}}-CH_2CH_3$ | 146–147 | [1] 135-7 | Methylene chloride-isopropyl ether. |

[1] Dec.

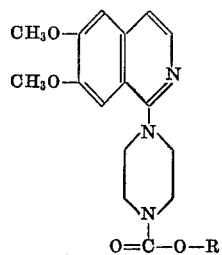

| R | M.P. base, °C. | M.P. hydrochloride, °C. | Recrystallization solvent |
|---|---|---|---|
| —CH₂CH₂Cl | 137.5-8 | ¹ 105-6 | Methanol-water. |
| —CH(CH₃)₂ | 155-6 | ¹ 102-4 | Methanol. |
| —CH₂CH₂CH₃ | 137-8 | ¹ 120-3 | Do. |
| —(CH₂)₂N(C₂H₅)₂ | 103-4 | 78-91 | Isopropyl ether. |
| —(CH₂)₂N(CH₃)₂ | 115 | ¹ 169-72 | Methylene chloride-isopropyl ether. |
| —(CH₂)₂NH₂ | 134-7 | ¹ 173-5 | Ethyl acetate-hexane. |
| —(CH₂)₂OCH₃ | 119-20 | ¹ 103-5 | Ethyl acetate-hexane. |

Example LVI

The procedures of Examples XXXVI, XXXVII, XXXVIII, XXXIX, XL, XLI, XLII, XLIII, XLVI, L, LI, LII, LIII, LIV and LV are used to prepare compounds of the following formulae:

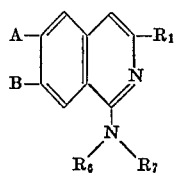

| A | B | $R_1$ | $R_6$ | $R_7$ |
|---|---|---|---|---|
| Benzo | | $CH_3$ | H | $CH_3$ |
| —O—CH₂—O— | | $C_2H_5$ | Isobutyl | H |
| —O—(CH₂)₂—O— | | Isobutyl | H | Phenyl |
| —O—(CH₂)₄—O— | | $C_6H_{13}$ | H | Naphthyl |
| $CH_3O$— | $C_2H_5O$— | H | $C_6H_{13}$ | $CH_3$ |
| $CH_3$ | OH | $CH_3$ | H | —(CH₂)₃— |
| OH | OH | H | | —(CH₂)₇— |
| $CH_3O$— | $CH_3O$— | H | H | —CH₂CH=CH₂ |
| OH | —O—CH(CH₃)(C₂H₅) | H | H | ![m-tolyl with CH₃] |
| $CH_3$ | $CH_3$ | H | H | ![dimethyl/propyl-phenyl with CH₃, C₃H₇] |
| $CH_3O$ | $CH_3O$ | H | $CH_3$ | —CH₂CH₂OH |
| H | $CH_3O$ | $CH_3$ | H | $CH_3$ |
| $CH_3O$ | H | H | $CH_3$ | $CH_3$ |
| $CH_3$ | $CH_3O$ | H | H | H |

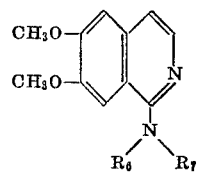

| $R_6$ | $R_7$ |
|---|---|
| —(CH₂)₃—C₆H₅ (phenyl) | phenyl / H |
| H | isopropyl-dimethyl-phenyl (CH₃, CH(CH₃), CH₃) |
| —CH₃ | —CH₂C=CHCH₃ with CH₂CH₃ |
| —C₆H₄—OCH₃ (para) | H |
| H | 3-chloro-methyl-phenyl (Cl, CH₃) |
| —(CH₂)₂—C₆H₃(OCH₃)(Cl)(OCH₃) | H |
| 4-methoxyphenyl with OCH(CH₃) | H |
| H | —C₆H₃(Br)(OC₄H₉) |
| H | —C₆H₃(OCH₃)(F) |

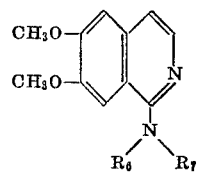

| A | B | $R_1$ | G |
|---|---|---|---|
| Benzo | | $CH_3$ | —O— |
| —O—(CH₂)₂—O— | | Isopropyl | —S— |
| —O—(CH₂)₄—O— | | $C_6H_{13}$ | >NH |
| $OCH_3$ | OH | $CH_3$ | >N—CH₃ |
| OH | $OC_2H_5$ | H | >N—CH(CH₃)₂ |

| A | B | $R_1$ | G |
|---|---|---|---|
| OH | OH | $CH_3$ | >N—H |
| $CH_3$ | $OCH_3$ | H | >N—$C_6H_{13}$ |
| H | $OCH_3$ | H | >N—$CH_2$—CH=$CH_2$ |
| $OCH_3$ | $OCH_3$ | H | >N—$CH_2$—CH($CH_3$)—CH=CH—$CH_3$ |
| $CH_3$ | $CH_3$ | H | >N—phenyl |
| $OC_2H_5$ | OH | H | >N—(3-methylphenyl) |
| $OCH_3$ | OH | $CH_3$ | >N—(3-methyl-4-propylphenyl) |
| $OCH_3$ | OH | H | >N—naphthyl |
| OH | $OCH_3$ | H | >N—C(=O)—O—$CH_2$—CH=$CH_2$ |
| | Benzo | H | >N—C(=O)—O—$CH_2$—CH($CH_3$)—CH=CH—$CH_3$ |
| OH | OH | $CH_3$ | >N—C(=O)—O—phenyl |
| $OC_2H_5$ | OH | $CH_3$ | >N—C(=O)—O—(2,6-dimethylphenyl) |
| $OCH_3$ | OH | $CH_3$ | >N—C(=O)—O—(2-methyl-4-propylphenyl) |
| $OCH_3$ | OH | $CH_3$ | >N—C(=O)—O—naphthyl |
| $OCH_3$ | $OCH_3$ | H | >N—C(=O)—$CH_3$ |
| $OCH_3$ | $CH_3$ | $CH_3$ | >N—C(=O)—CH($CH_3$)$_2$ |
| $OC_2H_5$ | OH | H | >N—C(=O)—$C_5H_{11}$ |

| A | B | $R_1$ | G |
|---|---|---|---|
| | Benzo | H | >N—C(=O)—phenyl |
| —O—$(CH_2)_3$—O— | | H | >N—C(=O)—(3-methylphenyl) |
| $OCH_3$ | OH | $CH_3$ | >N—C(=O)—(2-methyl-4-propylphenyl) |
| H | $OCH_3$ | H | >N—C(=O)—naphthyl |
| $OCH_3$ | $OCH_3$ | H | >N—C(=O)—O—$CH_3$ |
| $OCH_3$ | $OCH_3$ | H | >N—C(=O)—O—CH($CH_3$)$_2$ |
| OH | $OCH_3$ | $CH_3$ | >N—C(=O)—O—$C_6H_{13}$ |

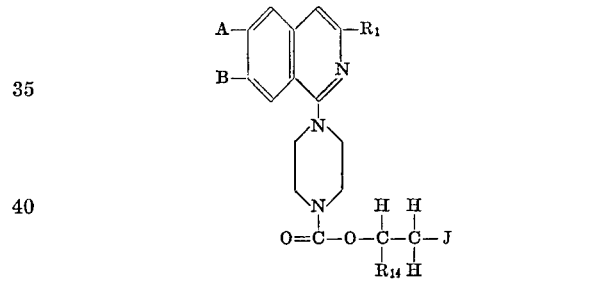

| A | B | $R_1$ | $R_{14}$ | J |
|---|---|---|---|---|
| $CH_3O$ | $C_3H_7O$ | $CH_3$ | $CH_2OH$ | OH |
| $CH_3O$ | $CH_3CHCH_3$<br>  $CH_2$<br>  O<br>  $CH_3$ | $C_3H_7$ | $CH_3$ | OH |
| $C_6H_{13}O$<br>$CH_3CH—CH_3$<br>   $(CH_2)_3$<br>   O<br>   $CH_3$ | $CH_3O$<br>$CH_3O$ | Isobutyl<br>$C_6H_{13}$ | $C_2H_5$<br>$CH_3$ | C<br>OH |
| OH | OH | $CH_3$ | H | OH |
| $CH_3$ | Benzo | $CH_3$ | H | OH |
| $CH_3$ | $CH_3O$— | H | H | H |
| H | $CH_3O$ | $CH_3$ | H | Cl |
| | —O—$CH_2$—O— | H | H | Br |
| | —O—$(CH_2)_4$—O— | H | H | $CH_3$ |
| $CH_3O$ | H | H | Isobutyl | OH |

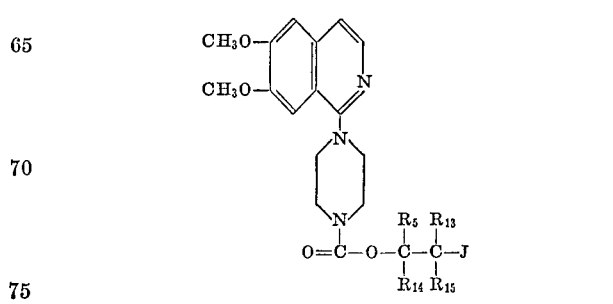

| $R_5$ | $R_{13}$ | $R_{14}$ | $R_{15}$ | J |
|---|---|---|---|---|
| $CH_3$ | H | $CH_3$ | H | H |
| $C_2H_5$ | H | H | $C_2H_5$ | OH |
| Isobutyl | H | H | H | Br |
| $CH_3$ | $CH_3$ | $C_2H_5$ | H | Cl |
| $CH_3$ | H | Isobutyl | H | $NH_2$ |
| $CH_2OH$ | H | H | Isobutyl | H |
| $CH_3$ | Isobutyl | H | $CH_2OH$ | H |
| $CH_3$ | $C_3H_7$ | H | H | $-O-\overset{O}{\underset{}{C}}-\underset{CH_3}{\overset{CH_3}{CH}}$ |
| H | H | H | H | $-O-\overset{O}{\underset{}{C}}-\text{(naphthyl)}$ |
| H | $CH_3$ | H | H | $-O-\overset{O}{\underset{}{C}}-\text{(o-methylphenyl)}$ |
| H | H | H | H | $-O-\overset{O}{\underset{}{C}}-\text{(2,5-di-substituted phenyl with } C_3H_7, CH_3\text{)}$ |
| | $-(CH_2)_4-$ | H | $CH_3$ | $-O-\overset{O}{\underset{}{C}}-CH_3$ |
| | $-(CH_2)_7-$ | $C_2H_5$ | H | $-O-\overset{O}{\underset{}{C}}-H$ |
| H | H | H | H | $-\underset{H}{N}-\overset{O}{\underset{}{C}}-C_6H_5$ |
| H | H | $CH_3$ | H | $-\underset{H}{N}-\overset{O}{\underset{}{C}}-\text{(naphthyl)}$ |
| $CH_3$ | H | H | H | $-\underset{H}{N}-\overset{O}{\underset{}{C}}-\text{(3,5-di-substituted phenyl with } CH_3, C_3H_7\text{)}$ |
| H | $CH_3$ | $CH_3$ | H | $-N(CH_3)_2$ |
| H | $C_2H_5$ | H | H | $-N\begin{pmatrix}CH_3\\CH(C_2H_5)CH_3\end{pmatrix}$ |
| H | H | H | H | $-\underset{H}{N}-\text{(naphthyl)}$ |
| H | H | H | H | $-\underset{H}{N}-\text{(m-methylphenyl)}$ |
| $CH_3$ | H | H | H | $-\underset{H}{N}-\text{(phenyl with } C_3H_7, CH_3\text{)}$ |

| $R_5$ | $R_{13}$ | $R_{14}$ | $R_{15}$ | J |
|---|---|---|---|---|
| H | H | H | H | $-N\begin{pmatrix}CH_2\\(CH_2)_5\\CH_2\end{pmatrix}$ |
| H | H | $CH_3$ | H | $-N\begin{pmatrix}H\\C_2H_5\end{pmatrix}$ |
| H | H | H | $CH_3$ | $-N\begin{pmatrix}CH_2\\(CH_2)_2\\CH_2\end{pmatrix}$ |
| H | H | H | H | $-\underset{H}{N}-\underset{O}{\overset{}{CH}}$ |
| H | $CH_3$ | $CH_3$ | H | $-O-CH_3$ |
| H | H | H | $CH_3$ | $-O-C_2H_5$ |
| H | $CH_3$ | H | H | $-O-\underset{C_2H_5}{\overset{CH_3}{CH}}$ |
| $CH_3$ | H | H | H | $-O-\text{phenyl}$ |
| H | $CH_3$ | $C_2H_5$ | H | $-O-\text{naphthyl}$ |
| H | H | H | H | $-O-\text{(phenyl with } CH_3, C_3H_7\text{)}$ |
| H | H | H | H | $-\underset{H}{N}-\overset{O}{\underset{}{C}}-CH_3$ |
| H | H | H | H | $-\underset{H}{N}-\overset{O}{\underset{}{C}}-C_2H_5$ |
| H | $CH_3$ | H | H | $-\underset{H}{N}-\overset{O}{\underset{}{C}}-\underset{C_2H_5}{\overset{CH_3}{CH}}$ |
| $CH_3$ | H | H | H | $-NH_2$ |
| $CH_3$ | H | H | H | $-\underset{H}{N}-\text{phenyl}$ |
| H | H | H | H | $-N(\text{phenyl})_2$ |
| H | H | H | H | $-\underset{CH_3}{N}-\text{naphthyl}$ |

| R₅ | R₁₃ | R₁₄ | R₁₅ | J |
|---|---|---|---|---|
| H | H | H | H | —N(CH₃)—C₆H₃(CH₃)(C₃H₇) |

Example LVII.—Bronchodilator activity

The procedures given in Example XXIX were used to evaluate the bronchodilator activities of the following compounds. The percent protection was evaluated in the manner given in Example XXIX. The same dosage levels were used.

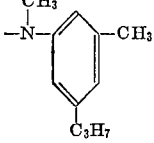

| $R_1$ | $R_{13}$ | $R_{15}$ | J | Percent protection |
|---|---|---|---|---|
| H | CH₃ | CH₃ | H | 24 |
| H | CH₃ | CH₃ | OH | 17 |

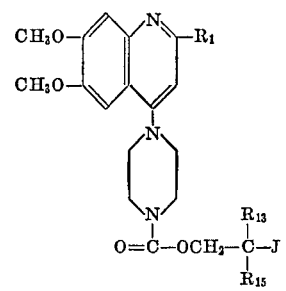

| $R_1$ | $R_6$ | $R_7$ | Percent protection |
|---|---|---|---|
| H | H | CH₂CH₃ | 14 |

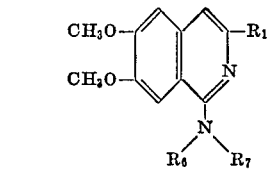

| $R_1$ | $R_{13}$ | $R_{15}$ | J | Percent protection |
|---|---|---|---|---|
| H | H | H | H | 20 |
| H | CH₃ | H | H | 30 |
| H | CH₃ | CH₃ | OH | *62 |

* This compound shows 80% protection after 8 hours.

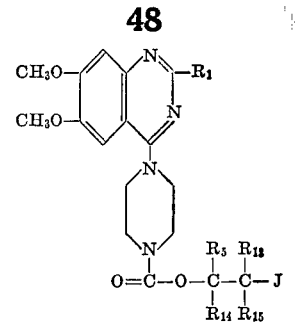

| $R_1$ | $R_5$ | $R_{13}$ | $R_{14}$ | $R_{15}$ | J | Percent protection |
|---|---|---|---|---|---|---|
| H | H | CH₃ | H | CH₃ | H | 50 |
| H | H | CH₃ | H | CH₃ | OH | 50 |
| H | H | CH₃ | H | CH₃ | Cl | 43 |
| H | H | CH₃ | H | =CH₂ | | 18 |
| H | H | H | H | H | N(CH₂CH₃)₂ | 9 |

Example LVIII

Spirally cut strips of guinea pig trachea were prepared as described by J. W. Constantine, J. Pharm. Pharmacol., 16, 384 (1965). Isometric relaxations were recorded using a force displacement transducer (Model FT–03, Grass Instrument Co., Quincy, Mass.) connected to a Grass Model 7 polygraph (Grass Instrument Co., of Quincy, Mass.).

The relative smooth muscle relaxing effects of each of the compounds tested were compared as follows:

(1) The muscle relaxant effect of a bathing medium of 0.03 µg./ml. of isoproterenol was determined for each strip and was shown to be supramaximal. This response was taken as the maximum relaxation of the strip.

(2) Subsequent relaxations of a given strip, to logarithmically-spaced concentrations of the compounds under test, were determined and were converted to percent of isoproterenol-induced relaxation. Curves of doasage vs. percent of maximum relaxation were obtained fo reach compound.

(3) The figure reported below for each compound was that concentration (expressed in µg./ml.) of compound which was needed to obtain 50% of maximum relaxation ($EC_{50}$) of the tracheal strip. Consequently, the smaller the $EC_{50}$ the more potent the compound was as a smooth muscle relaxant.

(4) Two standard compounds, theophylline (a known bronchodilator) and papaverine, were evaluated as well.

The following compounds were tested with corresponding values of $EC_{50}$:

| | $EC_{50}$ |
|---|---|
| Theophylline | 6.4 |
| Papaverine | 0.3 |

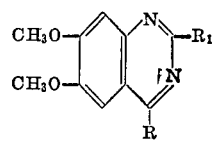

| R | $R_1$ | $EC_{50}$ |
|---|---|---|
| $-NH_2$ | H | 3.2 |
| $-NHCH_3$ | H | 1.8 |
| $-NHCH(CH_3)_2$ | H | 4.0 |
| $-NH(CH_2)_2C_6H_5$ | H | 0.4 |
| $-N(CH_2CH_3)_2$ | H | 0.78 |
| $-NH-\triangleleft$ | H | 1.9 |
| $-N(CH_2CH_2CH_3)_2$ | H | 0.4 |
| $-N(CH_2CH=CH_2)_2$ | H | 0.6 |
| $-N(CH_2CH_2CH_2CH_3)_2$ | H | 0.6 |
| $-NH_2$ | $CH_2CH_3$ | 0.5 |
| azetidinyl | H | 0.5 |
| piperidinyl | H | 0.21 |
| piperidinyl | H | 0.51 |
| $-N$(piperazinyl)$N-C(O)-O-CH_2CH(CH_3)_2$ | H | 1.0 |
| $-N$(piperazinyl)$N-C(O)-OCH_2CH(CH_3)_2$ | $CH_3$ | 0.7 |
| Same as above | $CH_2CH_3$ | 5.8 |
| Do | $-CH_2CH(CH_3)_2$ | 5.8 |
| $-N$(piperazinyl)$N-C(O)-OCH_2C(CH_3)_2-OH$ | H | 0.8 |
| $-N$(piperazinyl)$N-C(O)-OCH_2C(CH_3)_2-Cl$ | H | 0.27 |

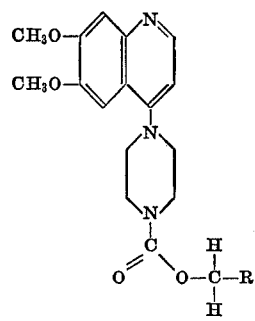

| R | $EC_{50}$ |
|---|---|
| $-CH(CH_3)_2$ | 0.7 |
| $-CH_3$ | 1.2 |
| $-C(CH_3)_2OH$ | 0.8 |

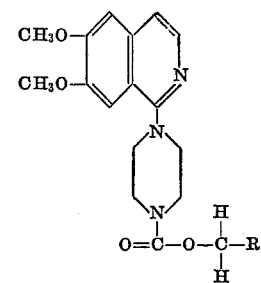

| R | $EC_{50}$ |
|---|---|
| $-CH_3$ | 0.25 |
| $-CH(CH_3)_2$ | 0.7 |
| $-C(CH_3)_2OH$ | 0.25 |

Example LIX

When the procedures analagous to those of Examples VII, XVIII, XIX, XX, XXI XXXVI, XXXVII, XXXVIII, XXXIX, XL, XLI, XLII and XLIII are used for the following compounds may be produced:

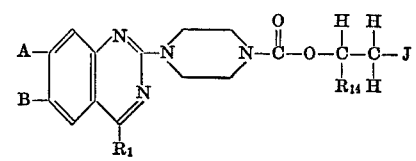

| A | B | $R_1$ | $R_{14}$ | J |
|---|---|---|---|---|
| $CH_3O$ | $C_3H_7O$ | $CH_3$ | $CH_2OH$ | OH |
| $CH_3O$ | $CH_3CHCH_3$ | $C_3H_7$ | $CH_3$ | OH |
| | $-OCH_2-$ | | | |
| $C_6H_{13}O$ | $CH_3O$ | Isobutyl | $C_2H_5$ | Cl |
| $CH_3-CH-CH_3$ | $CH_3O$ | $C_6H_{13}$ | $CH_3$ | OH |
| $(CH_2)_3$ | | | | |
| $-O-$ | | | | |
| OH | OH | $CH_3$ | H | OH |
| | Benzo | $CH_3$ | H | OH |
| $CH_3$ | $CH_3O-$ | H | H | H |
| $CH_3$ | $CH_3$ | $CH_3$ | H | H |
| H | $CH_3O$ | H | H | Cl |
| | $-O-CH_2-O-$ | H | H | Br |
| | $-O-(CH_2)_4-O-$ | H | H | $CH_3$ |
| $CH_3O$ | H | H | Isobutyl | OH |

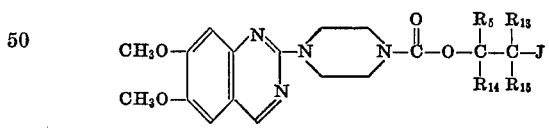

| $R_5$ | $R_{13}$ | $R_{14}$ | $R_{15}$ | J |
|---|---|---|---|---|
| $CH_3$ | H | $CH_3$ | H | H |
| $C_2H_5$ | H | H | $C_2H_5$ | OH |
| Isobutyl | H | H | H | Br |
| $CH_3$ | $CH_3$ | $C_2H_5$ | H | Cl |
| $CH_3$ | H | Isobutyl | H | $NH_2$ |
| $CH_2OH$ | H | H | Isobutyl | H |
| $CH_3$ | Isoautyl | H | $CH_2OH$ | H |
| $CH_3$ | $C_3H_7$ | H | H | $-O-C(O)-CH(CH_3)_2$ |
| H | H | H | H | $-O-C(O)-naphthyl$ |
| H | $CH_3$ | H | H | $-O-C(O)-(methylphenyl)$ |

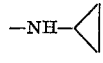

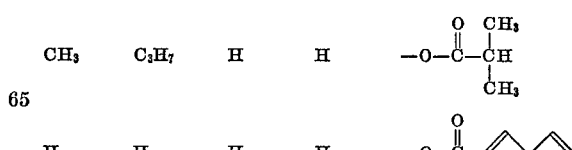

| R₅ | R₁₃ | R₁₄ | R₁₅ | J |
|---|---|---|---|---|
| H | H | H | H | —O—C(=CH₂)—C₆H₃(C₃H₇)(CH₃) |
| —(CH₂)₄— | H | CH₃ | —O—C(=O)—CH₃ | |
| —(CH₂)₇— | C₂H₅ | H | —O—C(=O)—H | |
| H | H | H | H | —N(H)—C(=O)—C₆H₅ |
| H | H | CH₃ | H | —N(H)—C(=O)—C₁₀H₇ (naphthyl) |
| CH₃ | H | H | H | —N(H)—C(=O)—C₆H₃(CH₃)(C₃H₇) |
| H | CH₃ | CH₃ | H | —N(CH₃)₂ |
| H | C₂H₅ | H | H | —N(CH₃)(CH(C₂H₅)(CH₃)) |
| H | H | H | H | —N(H)—naphthyl |
| H | H | H | H | —N(H)—C₆H₄—CH₃ |
| CH₃ | H | H | H | —N(H)—C₆H₃(C₃H₇)(CH₃) |
| H | H | H | H | —N(CH₂CH₂)₂(CH₂)₅ (piperidine-like) |
| H | H | CH₃ | H | —N(H)(C₂H₅) |
| H | H | H | CH₃ | —N(CH₂CH₂)₂CH₂ (pyrrolidine-like) |
| H | H | CH₃ | H | —N(H)—CH=O |
| H | CH₃ | CH₃ | H | —O—CH₃ |
| H | H | H | CH₃ | —O—C₂H₅ |
| H | CH₃ | H | H | —O—CH(CH₃)(C₂H₅) |

| R₅ | R₁₃ | R₁₄ | R₁₅ | J |
|---|---|---|---|---|
| CH₃ | H | H | H | —O—C₆H₅ |
| H | CH₃ | C₂H₅ | H | —O—naphthyl |
| H | H | H | H | —O—C₆H₃(CH₃)(C₃H₇) |
| H | H | H | H | —N(H)—C(=O)—CH₃ |
| H | H | H | H | —N(H)—C(=O)—C₂H₅ |
| H | CH₃ | H | H | —N(H)—C(=O)—CH(CH₃)(C₂H₅) |
| CH₃ | H | H | H | —NH₂ |
| CH₃ | H | H | H | —N(H)—C₆H₅ |
| H | H | H | H | —N(C₆H₅)₂ |
| H | H | H | H | —N(CH₃)—naphthyl |
| H | H | H | H | —N(CH₃)—C₆H₃(CH₃)(C₃H₇) |

Example LX

The compounds of this invention were evaluated with respect to their power to inhibit the action of cyclic 3′,5′-nucleoside phosphodiesterase which can act to destroy 3′,5′ adenosine monophosphate.

The cyclic 3′,5′-nucleoside phosphodiesterase was isolated using the procedure of R. W. Butcher and E. W. Sutherland, J. Biol. Chem., 237, 1244 (1962) and their purification procedure was carried through the third step given, namely through the ammonium sulfate fractionation, dialysis and freezing steps, but not through the chromatographic fractionation step.

For each compound tested, two substrates, containing each of the two control inhibitory compounds, and one substrate containing no inhibitory compound were prepared. Each substrate had a total volume of 2 ml., was $4 \times 10^{-4}$ molar in 3′,5′ adenosine monophosphate, contained 0.02 ml. of cyclic 3′,5′-nucleoside phosphodiesterase and 4.0 μmoles of $MgSO_4$, 0.2 μmole ethylene diamine tetraacetate and 80 μmoles of a suitable buffer which was to maintain the pH at 7.5. Where the substrate also contained a novel compound whose phosphodiesterase inhibitory power was to be tested or contained a control inhibitory compound, the compound was present at a concentration of $10^{-4}$ molar.

Two control compounds, papaverine and theophylline, a known bronchodilator, were run with each novel compound. Thus, at least four substrates, each containing 3′,5′ adenosine monophosphate, were run for each novel compound evaluated. One contained the novel compound, another contained theophylline, another contained papaverine and the last contained no phosphodiesterase inhibitor at all.

Each substrate was incubated for 30 minutes at 30° C. after which the reaction was stopped by boiling for 10 minutes. At this point one mg. of lyophilized Crotolus atrox venom dissolved in one ml. of pH 7.5 buffer was added and the new mixture was incubated for 30 minutes at 30° C. and this reaction was also stopped by boiling for 10 minutes. The venom reacts with 5′-adenosine monophosphate, a product of the reaction between phosphodiesterase and 3′,5′-adenosine monophosphate, to release inorganic phosphate. Thus, a low final concentration of inorganic phosphate indicates that a small amount of 5′-adenosine monophosphate was formed and, therefore, that the phosphodiesterase activity was inhibited. The inorganic phosphorus was determined colorimetrically by the methods of C. H. Fiske and Y. Subbarow, J. Biol. Chem., 66, 375 (1925).

The percent inhibition was taken as the difference between the inorganic phosphate concentration in the substrate containing the inhibiting compound and the concentration in the substrate containing no inhibitor divided by the concentration in the substrate without inhibitor.

The following compounds were tested:

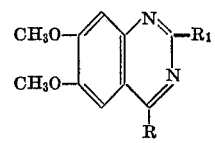

| R | $R_1$ | Percent inhibition | Percent inhibition Theophylline | Papaverine |
|---|---|---|---|---|
| —NHCH(CH₃)₂ | H | 50 | 16 | 63 |
| —N(CH₂CH₃)₂ | H | 63 | 16 | 63 |
| —N(CH₂CH₂CH₃)₂ | H | 73 | 16 | 63 |
| —NHCH₂CH₂C₆H₅ | H | 58 | 16 | 63 |
| —NHCH₃ | H | 36 | 16 | 63 |
| —NH₂ | CH₃CH₃ | 45 | 17 | 71 |
| —N(CH₂CH=CH₂)₂ | H | 35 | 21 | 56 |
| —N(CH₂CH₂CH₃)₂ | H | 79 | 21 | 56 |
| —NH₂ | CH(CH₃)₂ | 26 | 19 | 71 |
| —NH₂ | C₆H₅ | 38 | 19 | 71 |
| —N⟨ ⟩N—C(=O)—O—CH₂CH(CH₃)CH₃ | H | 30 | 16 | 63 |
| —N⟨ ⟩N—C(=O)—OCH₂CH(CH₃)CH₃ | CH₃ | 35 | 27 | 43 |
| —N⟨ ⟩N—C(=O)—O—CH₂CH(CH₃)CH₃ | CH₂CH₃ | 46 | 27 | 43 |
| Same as above | CH(CH₃)₂ | 39 | 27 | 43 |
| Do | CH₂CH₂CH₃ | 51 | 27 | 43 |
| —NH₂ | CH₂CH₂C₆H₅ | 31 | 19 | 71 |
| —N⟨ ⟩ (5-membered) | H | 35 | 13 | 42 |
| —N⟨ ⟩ (6-membered) | H | 72 | 13 | 42 |
| —N⟨ ⟩ (6-membered) | H | 76 | 13 | 42 |
| —N⟨ ⟩N—C(=O)—O—CH₂—C(CH₃)(CH₃)—OH | H | 43 | 20 | 74 |

3,594,480

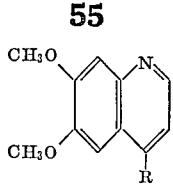

| R | Percent inhialtion | Percent inhibition Theophylline | Papaverine |
|---|---|---|---|
| 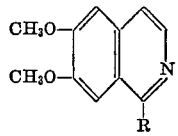 | 39 | 4 | 70 |
| (isobutyl ester) | 55 | 4 | 70 |
| (hydroxy isobutyl) | 33 | 4 | 77 |

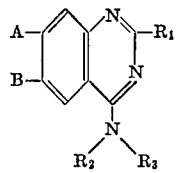

| R | Percent inhibition | Percent inhibition Theophylline | Papaverine |
|---|---|---|---|
| 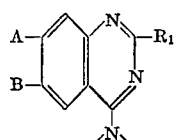 | 35 | 23 | 75 |
| (isobutyl ester) | 55 | 23 | 75 |
| (hydroxy isobutyl) | 38 | 18 | 76 |

What is claimed is:
1. A method of effecting bronchodilator action, which comprises administering to a subject an effective amount of a compound selected from the formulae:

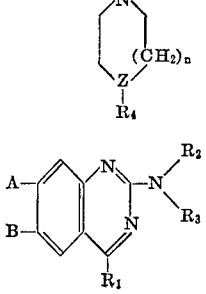

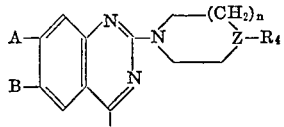

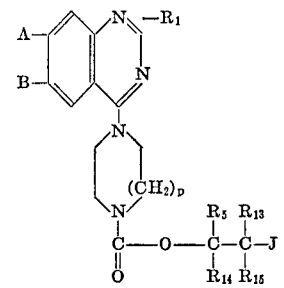

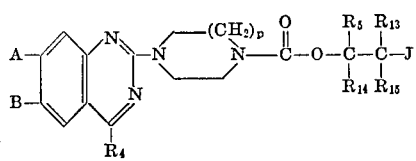

and the pharmaceutically-acceptable acid addition salts thereof, wherein A and B are each selected from the group consisting of alkoxy containing from 1 to 5 carbon atoms, hydrogen, hydroxy and methyl, provided that when A or B are hydrogen, the other is never hydrogen; A and B, taken together, are selected from the group consisting of benzo and alkylenedioxy having up to 4 carbon atoms; $R_1$ is H or alkyl containing from 1 to 6 carbon atoms; $R_2$ and $R_3$ are each selected from the group consisting of H, phenyl, phenylalkyl, alkyl, alkenyl, hydroxyalkyl and cycloalkyl, said alkyl, alkenyl and cycloalkyl moieties having up to 6 carbon atoms; Z is selected from $-CH_2-$, O and N, provided that when Z is $-CH_2-$ or O, $n$ is equal to one and when Z is N, $n$ is equal to one or two; $R_4$ is selected from the group consisting of H, alkyl, alkenyl, aryl hydrocarbon, alkylcarbonyl, aryloxycarbonyl, alkenyloxycarbonyl, benzoyl, naphthoyl and alkyloxycarbonyl, said alkyl and alkenyl moieties having up to 6 carbons atoms and said aryl hydrocarbon moiety having up to 10 carbon atoms; $R_5$, $R_{13}$, $R_{14}$ and $R_{15}$ are each selected from the group consisting of H, alkyl containing from 1 to 4 carbon atoms and hydroxymethyl; $R_5$ and $R_{13}$, taken together, are cycloalkyl having from 4 to 7 carbon atoms; J is selected from the group consisting of H, hydroxy, formyloxy, acyloxy containing from 2 to 5 carbon atoms, aroyloxy containing up to 11 carbon atoms, alkoxy containing from 1 to 4 carbon atoms, aryloxy containing up to 10 carbon atoms, chloro, bromo, formamido, alkylamido having up to 10 carbon atoms in the aryl group, and amino, containing up to two substituents, each being selected from the group consisting of hydrogen, alkyl having up to 4 carbon atoms, aryl containing up to 10 carbon atoms, and the two substituents, taken together, being cycloalkyl containing from 4 to 7 carbon atoms; $p$ is one or two.

2. The method of claim 1 wherein said compound is 4-amino-6,7-dimethoxyquinazoline.

3. The method of claim 1 wherein said compound is 4 - (6,7 - dimethoxyquinazolin - 4 - yl)-piperazine-1-carboxylic acid, isobutyl ester.

4. The method of claim 1 wherein said compound is 2-ethyl-4-amino-6,7-dimethoxyquinazoline.

5. The method of claim 1 wherein said compound is 4-(2-n-propyl-6,7-dimethoxyquinazolin-4-yl) - piperazine-1-carboxylic acid, isobutyl ester.

6. The method of claim 1 wherein said compound is 4-(2-methyl-6,7-dimethoxyquinazolin-4-yl) - piperazine-1-carboxylic acid, isobutyl ester.

7. The method of claim 1 wherein said compound is 4-(2-ethyl-6,7 - dimethoxyquinazolin-4-yl) - piperazine-1-carboxylic acid, isobutyl ester.

8. The method of claim 1 wherein said compound is 4 - (6,7 - dimethoxyquinazolin-4-yl) - piperazine - 1 - carboxylic acid, 2-methyl-2-hydroxypropyl ester.

9. The method of claim 1 wherein said compound is 4-(6,7-dimethoxyquinazolin-4-yl) - piperazine - 1 - carboxylic acid, 2-methyl-2-propenyl ester.

10. The method of claim 1 wherein said compound is 4-(6,7 - dimethoxyquinazolin-4-yl) - piperazine - 1 - carboxylic acid, 2-methyl-2-chloropropyl ester.

11. A method of effecting hypotensive action, which comprises administering to a subject an effective amount of a compound selected from the group consisting of those of the formulae:

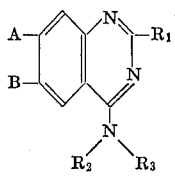

and

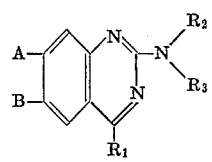

and the pharmaceutically-acceptable acid addition salts thereof, wherein A and B are selected from the group consisting of alkoxy containing from 1 to 5 carbon atoms, hydrogen, hydroxy and methyl, provided that when A or B is hydrogen, the other is never hydrogen; A and B, taken together, are selected from the class consisting of benzo and alkylenedioxy having up to 4 carbon atoms; $R_1$ is H or alkyl containing from 1 to 6 carbon atoms; $R_2$ and $R_3$ are selected from the group consisting of H, phenyl, phenylalkyl, alkyl, alkenyl, hydroxyalkyl and cycloalkyl, said alkyl, alkenyl and cycloalkyl moieties having up to 6 carbon atoms.

12. The method of claim 11 wherein said compound is 2-ethyl-4-amino-6,7-dimethoxyquinazoline.

13. The method of claim 11 wherein said compound is 2-methyl-4-amino-6,7-dimethoxyquinazoline.

14. The method of claim 11 wherein said compound is 4-amino-6,7-dimethoxyquinazoline.

15. The method of claim 11 wherein said compound is 2-n-propyl-4-amino-6,7-dimethoxyquinazoline.

16. A method of effecting bronchodilator action, which comprises administering to a subject an effective amount of a compound selected from the group consisting of those of the formula:

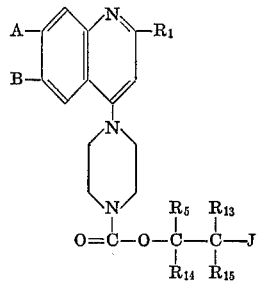

and the pharmaceutically-acceptable acid addition salts thereof, wherein A and B are each selected from the group consisting of alkoxy containing from 1 to 5 carbon atoms, hydrogen, hydroxy, and methyl, provided that when A or B are hydrogen, the other is never hydrogen; A and B, taken together, are selected from the group consisting of benzo and alkylenedioxy having up to 4 carbon atoms; $R_1$ is H or alkyl containing from 1 to 6 carbon atoms; $R_5$, $R_{13}$, $R_{14}$ and $R_{15}$ are each selected from the group consisting of H, alkyl containing from 1 to 4 carbon atoms and hydroxymethyl; $R_5$ and $R_{13}$, taken together, are cycloalkyl having from 4 to 7 carbon atoms; J is selected from the group consisting of H, hydroxy, formyloxy, acyloxy containing from 2 to 5 carbon atoms, aroyloxy containing up to 11 carbon atoms, alkoxy containing from 1 to 4 carbon atoms, aryloxy containing up to 10 carbon atoms, chloro, bromo, formamido, alkylamido having up to 4 carbon atoms in the alkyl group, arylamido having up to 10 carbon atoms in the aryl group, and amino, containing up to two substituents, each being selected from the group consisting of hydrogen, alkyl having up to 4 carbon atoms, aryl containing up to 10 carbon atoms, and the two substituents, taken together, being cycloalkyl containing from 4 to 7 carbon atoms.

17. A method of claim 16 wherein the compound is 4-(6,7-dimethoxyquinolin-4-yl)-piperazine - 1 - carboxylic acid, isobutyl ester.

18. A method of claim 16 wherein the compound is 4-(6,7-dimethoxyquinolin-4-yl)-piperazine - 1 - carboxylic acid, 2-methyl-2-hydroxypropyl ester.

19. A method of effecting bronchodilator action, which comprises administering to a subject an effective amount of a compound selected from the group consisting of those of the formulae:

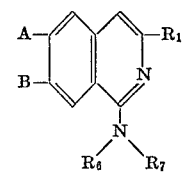
VII

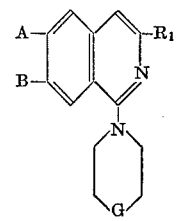
VIII and

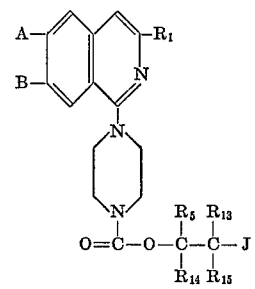
IX and the pharmaceutically-acceptable acid addition salts thereof, wherein A and B are each selected from the group consisting of alkoxy containing from 1 to 5 carbon atoms, hydrogen, hydroxy, and methyl, provided that when A or B are hydrogen, the other is never hydrogen; A and B, taken together, are selected from the group consisting of benzo and alkylenedioxy having up to 4 carbon atoms; $R_1$ is H or alkyl containing from 1 to 6 carbon atoms; $R_6$ and $R_7$ are each selected from the group consisting of H, alkyl containing up to 6 carbon atoms, aryl hydrocarbon containing up to 10 carbon atoms, aralkyl hydrocarbon containing up to 3 carbon atoms in the alkyl moiety and 7 carbon atoms in the aryl moiety, and β-hydroxyethyl; when $R_6$ and $R_7$ are aryl or aralkyl, the aryl moiety is substituted with up to 3 substituents selected from the group consisting of halogen and alkoxy containing up to 4 carbon atoms; $R_6$ and $R_7$, taken together, are cycloalkyl containing from 3 to 7 carbon atoms; G is selected from the group consisting of oxygen, sulfur, amino, alkylamino having up to 6 carbon atoms in the alkyl group, alkenylamino having from 3 to 6 carbon atoms in the alkenyl moiety, unsubstituted aryl hydrocarbon amino having up to 10 carbon atoms in the aryl moiety, acylamino having up to 6 carbon atoms in the acyl moiety, aroylamino having up to 11 carbon atoms in the aroyl moiety, carbalkoxyamino having up to 6 carbon atoms in the alkyl moiety, carbalkenyloxyamino having up to 6 carbon atoms in the alkenyl moiety, carbaryloxyamino having up to 10 carbon atoms in the aryl moiety; $R_5$, $R_{13}$, $R_{14}$ and $R_{15}$ are each selected from the group consisting of H, alkyl containing from 1 to 4 carbon atoms and hydroxymethyl; $R_5$ and $R_{13}$, taken together, are cycloalkyl having from 4 to 7 carbon atoms; J is selected from the group consisting of H, hydroxy, formyloxy, acyloxy containing from 2 to 5 carbon atoms, aroyloxy containing up to 11 carbon atoms, alkoxy containing from 1 to 4 carbon atoms, aryloxy containing up to 10 carbon atoms, chloro, bromo, formamido, alkylamido having up to 4 carbon atoms in the alkyl group, arylamido having up to 10 carbon atoms in the aryl group, and amino, containing up to two substituents, each being selected from the group consisting of hydrogen, alkyl having up to 4 carbon atoms, aryl containing up to 10 carbon atoms, and the two substituents, taken together, being cycloalkyl containing from 4 to 7 carbon atoms.

20. The method of claim 19 wherein the compound is 4-(6,7-dimethoxyisoquinolin-1-yl)-piperazine - 1 - carboxylic acid, isobutyl ester.

21. The method of claim 19 wherein the compound is 4-(6,7-dimethoxyisoquinolin-1-yl)-piperazine - 1 - carboxylic acid, ethyl ester.

22. The method of claim 19 wherein the compound is 4-(6,7-dimethoxyisoquinolin-1-yl)-piperazine - 1 - carboxylic acid, 2-methyl-2-hydroxypropyl ester.

23. The method of claim 19 wherein the compound is 4-ethylamino-6,7-dimethoxyisoquinoline.

References Cited
UNITED STATES PATENTS 2,461,950   2/1949   Wolf _____ 260—256.4

STANLEY J. FRIEDMAN, Primary Examiner

U.S. Cl. X.R.

424—244, 248, 251, 267